United States Patent
Lee et al.

(10) Patent No.: US 9,184,443 B2
(45) Date of Patent: Nov. 10, 2015

(54) CATHODE ACTIVE MATERIAL, METHOD OF PREPARING THE CATHODE MATERIAL, CATHODE, AND LITHIUM SECONDARY BATTERY INCLUDING THE SAME

(71) Applicant: Samsung SDI Co., Ltd., Yongin-si, Gyeonggi-do (KR)

(72) Inventors: Young-Hun Lee, Yongin-si (KR); Soon-Rewl Lee, Yongin-si (KR); Na-Ri Park, Yongin-si (KR); Young-Ki Kim, Yongin-si (KR); Ick-Kyu Choi, Yongin-si (KR); Yong-Chul Park, Yongin-si (KR); Hong-Kyu Choi, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 140 days.

(21) Appl. No.: 14/102,349

(22) Filed: Dec. 10, 2013

(65) Prior Publication Data

US 2015/0010819 A1     Jan. 8, 2015

(30) Foreign Application Priority Data

Jul. 8, 2013    (KR) .................. 10-2013-0079896

(51) Int. Cl.
| | |
|---|---|
| *H01M 4/525* | (2010.01) |
| *H01M 4/52* | (2010.01) |
| *C01D 15/02* | (2006.01) |
| *H01M 4/131* | (2010.01) |
| *H01M 4/1391* | (2010.01) |
| *H01M 4/485* | (2010.01) |
| *H01M 4/505* | (2010.01) |
| *H01M 10/0525* | (2010.01) |

(52) U.S. Cl.
CPC ............... *H01M 4/525* (2013.01); *C01D 15/02* (2013.01); *H01M 4/131* (2013.01); *H01M 4/1391* (2013.01); *H01M 4/485* (2013.01); *H01M 4/505* (2013.01); *H01M 4/523* (2013.01); *H01M 10/0525* (2013.01)

(58) Field of Classification Search
None
See application file for complete search history.

(56) References Cited

U.S. PATENT DOCUMENTS

| | | | |
|---|---|---|---|
| 2002/0110736 | A1 | 8/2002 | Kweon et al. |
| 2005/0175897 | A1 | 8/2005 | Jung et al. |
| 2009/0035659 | A1 | 2/2009 | Takeuchi et al. |
| 2011/0079752 | A1 | 4/2011 | Park et al. |

(Continued)

FOREIGN PATENT DOCUMENTS

| | | |
|---|---|---|
| CN | 101621125 A | 1/2010 |
| EP | 1 453 126 A1 | 9/2004 |

(Continued)

OTHER PUBLICATIONS

Partial European Search Report dated Jan. 8, 2015 for European Patent Application No. EP 14 155 163.0 which shares priority of Korean Patent Application No. KR 10-2013-0079896 with captioned U.S. Appl. No. 14/102,349.

*Primary Examiner* — Patrick Ryan
*Assistant Examiner* — Wyatt McConnell
(74) *Attorney, Agent, or Firm* — Knobbe Martens Olson & Bear LLP

(57) ABSTRACT

A cathode active material including at least two agglomerates of primary particles and a cathode and a lithium secondary battery containing the same are disclosed. In the cathode active material, a secondary particle includes a nickel-based lithium transition metal oxide, an average particle diameter of each primary particle is in a range from about 2 to about 3 µm, and an average particle diameter of the secondary particle is in a range from about 5 to about 8 µm.

20 Claims, 11 Drawing Sheets

(56) References Cited

U.S. PATENT DOCUMENTS

| | | |
|---|---|---|
| 2011/0127463 A1 | 6/2011 | Yuasa et al. |
| 2011/0291044 A1 | 12/2011 | Wang et al. |
| 2013/0108921 A1 | 5/2013 | Kase et al. |
| 2013/0323606 A1 | 12/2013 | Yoshida et al. |

FOREIGN PATENT DOCUMENTS

| | | |
|---|---|---|
| EP | 2 333 881 A1 | 6/2011 |
| EP | 2 523 240 A1 | 11/2012 |
| JP | 2005-025975 A | 1/2005 |
| KR | 10-2004-0106207 A | 12/2004 |
| KR | 10-2010-0130522 A | 12/2010 |
| WO | WO 2012/124240 A1 | 9/2012 |

CATHODE ACTIVE MATERIAL, METHOD OF PREPARING THE CATHODE MATERIAL, CATHODE, AND LITHIUM SECONDARY BATTERY INCLUDING THE SAME

RELATED APPLICATION

Any and all priority claims identified in the Application Data Sheet, or any correction thereto, are hereby incorporated by reference under 37 CFR 1.57. For example, this application claims the benefit of Korean Patent Application No. 10-2013-0079896 in the Korean Intellectual Property Office on Jul. 8, 2013, the disclosure of which is incorporated herein by reference in its entirety.

BACKGROUND

1. Field

This invention relate to a cathode active material, a method of preparing the cathode active material, a cathode and a lithium secondary battery including the same

2. Description of the Related Technology

With the trend toward compact and high-performance devices, manufacturing of lithium batteries that are small, lightweight and have high energy densities have become important. The stability of lithium batteries at high capacities, high temperatures, and high voltages is an important concern especially for applications in electric vehicles.

A variety of cathode active materials has been considered to produce a lithium battery for those applications.

The Nickel-based lithium transition metal oxides materials, which include nickel (Ni), cobalt (Co), and manganese (Mn), can provide high discharge capacity per unit weight, as compared with $LiCoO_2$. However, the nickel-based lithium transition metal oxides materials have a low mixture density and low capacity per unit volume. Thus, the nickel-based lithium transition metal oxides used in cathodehave low discharge capacity in a lithium secondary battery. In addition, when the lithium secondary battery is manufactured and operated at a high voltage using the nickel-based lithium transition metal oxides materials, stability of the lithium secondary battery may also be problematic.

Therefore, to provide a lithium secondary battery of high capacity, a method that can increase the mixture density and thermal stability of the nickel-based lithium transition metal oxides and increase the mixture density of a cathode is needed. In addition, a method that can increase the lifespan and battery stability when used at high voltage is necessary.

SUMMARY OF CERTAIN INVENTIVE ASPECTS

One aspect of the disclosed technology includes a cathode active material.

Another aspect of the disclosed technology relates to a cathode including the cathode active material.

An additional aspect of the disclosed technology relates to a lithium secondary battery including the cathode.

Another aspect of the disclosed technology relates to a method of preparing the cathode active material.

In some embodiments, a cathode active material including at least one secondary particle having at least two agglomerates of primary particles, in which the secondary particle includes a nickel-based lithium transition metal oxide, the secondary particle includes at least one selected from the group consisting of a small particle having an average particle diameter in a range from about 5 μm to about 8 μm and a large particle having an average particle diameter in a range from about 10 μm to about 20 μm, and a full width at half maximum of a (003) peak is in a range from about 0.120° to about 0.125° in X-ray diffraction (XRD) spectrum analysis.

In some embodiments, provided is a cathode including the above-described cathode active material.

In some embodiments, provided is a lithium secondary battery including the above-described cathode.

In some embodiments, provided is a method of preparing a cathode active material, the method including obtaining a nickel-based transition metal hydroxide by performing a first heat treatment on a nickel-based transition metal hydroxide precursor at a temperature in a range from about 400° C. to about 600° C.; and mixing the nickel-based transition metal hydroxide and a lithium precursor to have a 1.05 or greater weight ratio of lithium with respect to the transition metal and performing a second heat treatment thereon at a temperature of 1,000° C. to about 1,050° C.

DETAILED DESCRIPTION OF CERTAIN INVENTIVE EMBODIMENTS

Figure 1A:
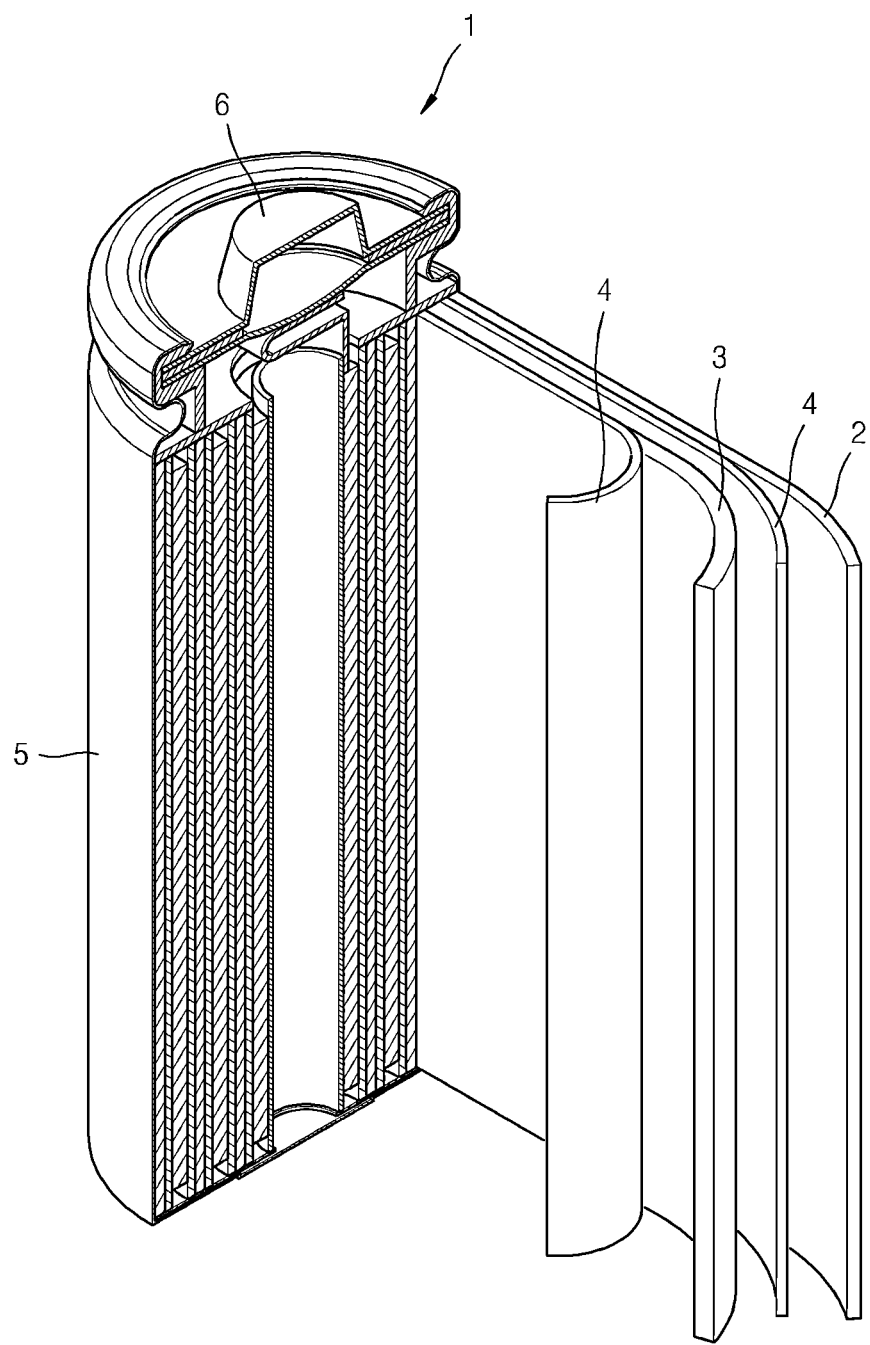
FIG. 1A is a schematic view illustrating a lithium secondary battery.

Reference will now be made in detail to embodiments, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Hereinafter, a cathode active material, a method of preparing the cathode active material, a cathode including the cathode active material, and a lithium secondary battery including the cathode active material will be described in greater detail.

A nickel (Ni)-based cathode active material is a material among several cathode active materials that are used in a lithium secondary battery. The nickel (Ni)-based cathode active material has a low discharge capacity and a problem in which safety is decreased when driving at high voltages. In some embodiments, a cathode active material formed of single particles is made by increasing the size of primary particles. This is different from the existing Ni-based cathode active material that is commonly formed of second particles by gathering primary particles that have an average particle diameter of 1 μm or less. When the cathode active material that is formed of single particles by increasing the size of primary particles is used, stability of the cathode slurry and the mixture density of the cathode may also increase during the cathode manufacturing process. Accordingly, when the cathode including the above-described cathode active material is used, a lithium secondary battery made with the cathode can have reduced gas generation at high voltages and also become more reliable and safer.

In some embodiments, a cathode active material may include at least one secondary particle including two or more agglomerates primary particles. Here, the secondary particle may include a Ni-based lithium transition metal oxide, and the primary particle may have an average particle diameter in the range of about 3 μm to 5 μm. In this regard, the secondary particle may be selected from the group consisting of small secondary particles having an average particle diameter in the range from about 3 μm to about 5 μm and large secondary particles having an average particle diameter in the range from about 10 μm to about 20 μm In the cathode active material, the primary particles may have an average particle diameter in a range from about 3.5 μm to about 4 μm. In this regard, the small secondary particles may have an average particle diameter in a range from about 5 μm to about 6 μm, and the large secondary particles may have an average particle diameter in a range from about 15 μm to about 17 μm.

When the small secondary particles in the cathode active material have an average particle diameter of less than about 5 μm, a mixture density of a plate may be decreased and stability of the lithium secondary battery may be also decreased. On the contrary, when the small secondary particles in the cathode active material have an average particle diameter of greater than 8 μm, the mixture density of the plate may be decreased. When the large secondary particles in the cathode active material have an average particle diameter of greater than about 20 μm, the mixture density of the cathode may be decreased or the high rate capability may be reduced. On the contrary, when the large secondary particles in the cathode active material have an average particle diameter of less than about 10 μm, the mixture density of a cathode may be also decreased.

The secondary particles in the cathode active material may be classified into small secondary particles having an average particle diameter in a range from about 5 to about 8 μm, large secondary particles having an average size in a range from about 10 to about 20 μm, and a mixture thereof. When the secondary particles in the cathode active material are a mixture of the small secondary particles and the large secondary particles, a mixing ratio of the small secondary particles and the large secondary particles is about 10:90 to about 30:70. In some embodiments, the mixing ratio of the small secondary particles and the large secondary particles is about 20:80 to about 15:85.

In some embodiments, the secondary particles in the cathode active material are formed of small secondary particles only, and the large particles in a lithium composite oxide are mixed therewith, capacity limit per volume of the cathode active material may increase. Accordingly, a high capacity cell may be obtained by maintaining an excellent mixture density of the cathode. Here, the mixture density of the cathode plate is, for example, in the range from about 3.9 to about 4.1 g/cm$^3$.

The lithium composite oxide may be lithium cobalt oxide (LiCoO$_2$), but is not limited thereto. Any lithium composite oxide known in the art may be used.

The amount of the large particles in the lithium composite oxide may be in a rage from about 70 to about 90 parts by weight based on 100 parts by weight of a total weight of the secondary particles of the cathode active material. When the amount of the large particles is within that range, an electrode that has excellent capacity property per volume may be manufactured without decreasing the swelling property. The swelling property is caused by gas generation at high voltages and high temperatures.

The large particles may have an average particle diameter in a range from about 15 to about 20 μm.

When the large secondary particles are used in the cathode active material, a mixture of a silicon-based material and a graphite material may be used as an anode active material, which is used along with a cathode that includes the cathode active material, to secure good cell efficiency during cell design. Here, the amount of the silicon-based material may be in a range from about 2 to about 10 parts by weight, for example, about 3 to about 5 parts by weight, based on 100 parts by weight of a total weight of the anode active material.

When the amount of the silicon-based material is within the above range, the capacity of the cell to maintain a constant volume may increase without having problems of volume expansion and contraction at degradation of initial efficiency or during initial charge and discharge.

An example of the silicon-based material is SiOx(0<x<2).

In some embodiments, the cathode, which is formed of the large secondary particles as those used in the cathode active material, has a mixture density in a range from about 3.7 to about 3.9 g/cm$^3$. Compared to the commercially available Ni-based lithium transition metal oxide having a mixture density of a plate in a range from about 3.3 to about 3.5 g/cm$^3$, the cathode formed of the large secondary particles has a high mixture density, and accordingly its capacity per volume may also be increased. In some embodiments, the cathode active material may have a single particle form.

In some embodiments, when the size of the primary particles and the secondary particles in the cathode active material are adjusted and put in the lithium secondary battery, gas generation at high voltages may decrease and reliability and safety of the lithium secondary battery may be achieved.

In some embodiments, various cathode active material may be prepared by adjusting the mixing weight ratio of lithium with respect to transition metals, and may be prepared by controlling conditions of heat treatment (i.e., a temperature of heat treatment, atmosphere, and time) during the cathode active material manufacturing process. Then, the size of the primary particles and the secondary particles in the cathode active material may be adjusted to reduce a specific surface area thereof, and to remove residual lithium as much as possible. The surface side reactions of the residual lithium and an electrolytic solution may be inhibited. By controlling the manufacturing process as described above, the cathode active material having good crystallinity and high-voltage stability may be obtained.

In some embodiments, with respect to X-ray diffraction (XRD) spectrum analysis of the Ni-based lithium transition metal oxide, a cathode that has a full width at half maximum (FWHM) of a (003) peak in a range from about 0.120 to about 0.125°, a FWHM of a (104) peak in a range from about 0.105 to about 0.110°, and a FWHM of a (110) peak in a range from about 0.110 to about 0.120° may be provided. The FWHM values indicate the crystallinity of the Ni-based lithium transition metal oxide.

With respect to the XRD spectrum analysis, a typical Ni-based lithium transition metal oxide may have a FWHM of a (003) peak in a range from about 0.13 to about 0.15°. As the FWHM values are lowered, the crystallinity of the Ni-based lithium transition metal oxide may be increased. That is, the crystallinity of the Ni-based lithium transition metal oxide may be higher than that of a typical Ni-based lithium transition metal oxide. When the Ni-based lithium transition metal oxide having the increased crystallinity is used as a cathode active material, a lithium secondary battery having good safety at high voltage may be manufactured.

In some embodiments, in the Ni-based lithium transition metal oxide, a share of Ni ions that occupy a lithium site is 0.4 atom % or less, for example, in a range from about 0.0001 to about 0.3 atom %. In a high-temperature thermal treatment process, a lithium ion $Li^+$ (ionic radius: 0.90 Å) and a nickel ion $Ni^{2+}$ (ionic radius: 0.83 Å) having almost the same ionic radius with $Li^+$ are mixed on a diffusing surface of the lithium ions, and the mixture tends to be a non-stoichiometric composition $[Li_{1-x}Ni_x]_{3b}[Ni]_{3a}[O_2]_{6c}$ (where, a, b, and c each indicate a site location of a structure, and x indicates the number of Ni ions being moved to a Li position (0≤x<1)). When $Ni^{2+}$ is mixed in the lithium site, this area may refer to as a halite layer (Fm3m) that is partially irregularly arranged. This area may be also electrochemically inert, and a solid phase diffusion of the lithium ions on a single layer may be interfered. Accordingly, a cell reaction may be inhibited.

In some embodiments, With respect to the XRD spectrum analysis, the cathode active material may have a hexagonal crystal structure. Here, a length of the a-axis may be in a range from about 2.867 to about 2.868 Å and a length of the c-axis may be in a range from about 14.228 to about 14.229 Å. Also, a unit cell volume thereof may be in a range from about 101.35 to about 101.40 Å³.

In some embodiments, in the XRD spectrum analysis, a CuK-alpha characteristic X-ray having a wavelength of about 1.541 Å may be used as a radiation source.

The amount of the residual LiOH in the cathode active material may be in a range from about 0.01 to about 0.06 wt %, and the amount of the lithium carbonate $Li_2CO_3$ may be in a range from about 0.05 to about 0.1 wt %. Here, the amounts of LiOH and $Li_2CO_3$ are measured by a titration method.

In some embodiments, in the cathode active material, the amount of the lithium carbonate ($Li_2CO_3$) measured by Gas chromatography-Mass Spectrometer (GC-MS) analysis may be in a range from about 0.01 to about 0.05 wt %.

As described above, when the amount of the residual LiOH and $Li_2CO_3$ is small, side reactions of the residual lithium and the electrolytic solution are inhibited to inhibit gas generation at a high voltage and at a high temperature. Accordingly, stability of the cathode active material may be increased. In addition, when the amount of the residual LiOH is small, the pH value of the slurry may be decreased in a cathode slurry preparation process. Accordingly, the cathode slurry becomes stable, and a uniform plate coating process is possible. A decrease in the amount of the residual lithium LiOH may secure stability of the slurry in the cathode slurry preparation process and the coating of the cathode plate.

In the DSC analysis, the cathode active material may have an on-set temperature in a range from about 250 to about 270° C. The cathode active material has a high on-set temperature compared to the on-set temperature of other commercial nickel cobalt manganese (NCM)-based cathode active material. Here, the cathode active material may have characteristics that an instant calorific value of a primary peak is decreased. Based on the above-described characteristics, a lithium ion secondary battery using the above-described cathode active material may have excellent safety at a high temperature.

When the above-described cathode active material is used, side reactions of the Ni-based lithium transition metal oxide and the electrolytic solution may be inhibited, and accordingly the thermal and structural stabilities of the Ni-based lithium transition metal oxide may be improved. Accordingly, better stability and charge/discharge characteristics of the lithium secondary battery including the above-described cathode active material may be achieved.

In some embodiments, in the cathode active material, the Ni-based lithium transition metal oxide may be a compound represented by Formula 1 below:

$$Li_xCo_aNi_bM_cO_{2+\alpha}$$ Formula 1

In Formula 1, 0.9<x<1.5, 0<a<0.5, 0<b<1, 0<c<1, −0.1≤α≤0.1, and M is at least one element selected from the group consisting of Mg, Ca, Sr, Ba, Ti, Zr, Nb, Mo, W, Zn, Al, Si, Mn, Cr, Fe, Mg, Sr, V, and a rare earth element.

In some embodiments, in the cathode active material, the Ni-based lithium transition metal oxide may be a compound represented by Formula 2 below:

$$Li_xCo_aNi_bM_cO_{2+\alpha}$$ Formula 2

In Formula 1, 0.9<x<1.1, 0<a<0.5, 0.4<b<1, 0<c<0.5, −0.1≤α≤0.1, and M is at least one element selected from the group consisting of Mg, Ca, Sr, Ba, Ti, Zr, Nb, Mo, W, Zn, Al, Si, Mn, Cr, Fe, Mg, Sr, V, and a rare earth element.

In some embodiments, in the cathode active material, the Ni-based lithium transition metal oxide may be a compound represented by Formula 3 below:

$$Li_xCo_aNi_bMn_cO_{2+\alpha}$$ Formula 3

In Formula 3, 0.9<x<1.1, 0<a<0.5, 0.4<b<1, 0<c<0.5, −0.1≤α≤0.1.

In some embodiments, the Ni-based lithium transition metal oxide may be $Li_{1.05}Ni_{0.5}Co_{0.2}Mn_{0.3}O_2$.

In some embodiments, in the method of preparing the cathode active material, when a heat treatment is performed under conditions of high temperature and oxidizing atmosphere, Li is sufficiently provided and a status of $Ni^{2+}$ is inhibited, thereby inhibiting the movement of $Ni^{2+}$ to the Li site. Accordingly, a cation mixing is minimized and crystallinity of the Ni-based lithium transition metal oxide may be increased.

The preparation method will be described in detail below.

The method of preparing the cathode active material includes performing a first heat treatment to a Ni-based transition metal oxide precursor at a temperature of 400° C. to 600° C. to obtain a Ni-based transition metal oxide; mixing the Ni-based transition metal oxide and a lithium precursor to have 1.05 or greater weight ratio of lithium with respect to the transition metal; and performing a second heat treatment to the mixture at a temperature of 1,000° C. to 1,050° C.

In some embodiments, the first and second heat treatments are performed under oxidizing gas atmosphere.

The oxidizing gas atmosphere refers to air or atmosphere including oxygen. In the atmosphere including oxygen, an amount of oxygen is in a rage of 20 to 40 volume %.

In some embodiments, the first heat treatment is performed in the oxidizing atmosphere for about 1 to about 5 hours, and the second heat treatment is performed in the oxidizing atmosphere for about 5 to about 10 hours.

When the first heat treatment is performed at a temperature above 600° C., single oxides are produced, and thus formation of uniform lithium transition metal oxides becomes difficult. When the first heat treatment is performed at a temperature below 400° C., results thereof may be equal to those obtained without performing heat treatment. When the second heat treatment is performed at a temperature above 1,040° C., the particle growth is excessively done, and thus electrochemical properties such as capacity and efficiency may rapidly decrease. When the second heat treatment is performed at a temperature below 1,000° C., the particle growth is dropped, and crystallinity is accordingly decreased. Also, the amount of Li that enters inside the structure or scatters therein is decreased, and accordingly the amount of the residual lithium on the surface of the cathode active material may be increased.

In some embodiments, the weight ratio of lithium based on the transition metal is adjusted to be 1.05 or greater. In some embodiments, the weight ratio of lithium based on the transition metal is adjusted to be, in a range from about 1.05 to about 1.08. When the weight ratio of lithium is less than 1.05, deficiency of required lithium occurs at the same temperature. Accordingly, it becomes difficult in terms of cation mixing, decreased crystallinity, and particular growth.

In some embodiments, the Ni-based transition metal hydroxide precursor may include small and large particles. Here, an average particle diameter of the small particles is in a range from about 6 μm to about 9 μm, and that of the large particles is in a range from about 11 μm to about 21 μm.

In some embodiments, the Ni-based transition metal hydroxide precursor may be prepared by co-precipitation of a Ni precursor and other transition metal precursors. For example, the Ni-based transition metal hydroxide precursor is a hydroxide that may include Ni and other metlas In some embodiments, the Ni-based transition metal hydroxide precursor may be prepared by mixing a Ni precursor, a Co precursor, and a Mn precursor, with a first solvent.

In some embodiments, the Ni precursor, Co precursor, and Mn precursor may use any material available in the art.

In some embodiments, the Ni precursor may be nickel sulfate, nickel chloride, or nickel nitrate.

In some embodiments, the Co precursor may be cobalt sulfate, cobalt chloride, or cobalt nitrate, and the Mn precursor may be manganese sulfate, manganese chloride, or manganese nitrate.

In some embodiments, the amount of the Ni precursor, Co precursor, and Mn precursor may be stoichiometrically adjusted to obtain a compound of Formula 1 above.

The first solvent may be water, ethanol, propanol, or butanol. In some embodiments, the amount of the first solvent may be in a range from about 100 to about 2,000 parts by weight based on 100 parts by weight of the Ni, Co, and Mn precursors.

When the Ni-based transition metal hydroxide is mixed with Li precursor are mixed, a second solvent may be used.

The second solvent may be water, ethanol, butanol, or propanol that is the same as the first solvent as described above.

In some embodiments, the amount of the second solvent may be in a range from about 100 to about 2,000 parts by weight based on 100 parts by weight of the lithium precursor.

In the preparation method described above, the lithium precursor may be lithium carbonate ($Li_2CO_3$), lithium hydroxide, or lithium fluride, but is not limited thereto. Any material that is available in the art may be used as a lithium precursor.

In some embodiments, a complexing agent and a pH adjuster may be added and mixed with the mixture of the Ni-based transition metal hydroxide and the lithium precursor.

The lithium precursor may use at least one selected from the group consisting of lithium hydroxide, lithium carbonate, lithium sulphate, and lithium nitrate.

The complexing agent may be ammonia solution as an ammonium ion supplier.

The pH adjuster may be sodium hydroxide aqueous solution.

The pH of the result product may be in a range from about 11 to about 13 by adjusting an amount of the pH adjuster.

In some embodiments, a precipitate is obtained from the result product, and is washed using pure water. Then, a second thermal treatment is performed to the washed precipitate to obtain the Ni-based transition metal oxide.

In the preparation method, the mixing of the Ni-based transition metal oxide and the lithium precursor may be performed by a wet or a dry process. Any method that may attach nano-particles on the core is available, but a wet or dry method such as mechanical milling or co-precipitation that is known in the art may be used.

In some embodiments, a cathode includes the above-described cathode active material.

The cathode includes a current collector and a cathode active material layer disposed on the current collector.

The cathode active material layer has a mixture density of about 3.9 g/cm$^3$ or greater. In some embodiments, the cathode active material layer has a mixture density in a range from about 3.9 g/cm$^3$ to about 4.2 g/cm$^3$. When the mixture density is within the above ranges, problems such as the lack of electrolytic solution impregnation, degradation of high-rate characteristics, and a crushing of active material particle may be prevented. Accordingly, a cathode having excellent discharge capacity may be obtained.

The term "mixture density of cathode active materials layer" used herein refers to an exterior mixture density in which cathode active materials layer including composite cathode active materials is compressed at a pressure of about 2.5 ton/cm$^2$.

The composition of the cathode active material that includes the cathode active material and a binding agent may be molded into a predetermined shape to prepare the cathode, or the composition of the cathode active material may be coated on the current collector of aluminum foil or the like to prepare the cathode.

In some embodiments, a cathode active material composition including a mixture of the cathode active material, a conductor, the binder, and a solvent is prepared. Here, the cathode active material composition may be directly coated on top of a metal current collector to prepare a cathode plate. Alternatively, the cathode active material composition may be cast on a separate support, and then a film that is exfoliated from the support may be laminated on the metal current collector to prepare a cathode. The cathode is not limited to the above-described formation, and may be formed in a different shape.

In addition, any conventional cathode active material that is known in the art may be further included to the cathode having the cathode active material.

In some embodiments, the conventional cathode active material may include at least one selected from the group consisting of lithium cobalt oxide, lithium nickel cobalt manganese oxide, lithium nickel cobalt aluminum oxide, lithium iron phosphate, and lithium manganese oxide, but is not limited thereto. Any cathode active material that is available in the art may be further used.

The cathode active material may use a compound represented by any one of the following formulae: $Li_aA_{1-b}B_bD_2$ (where, $0.90 \leq a \leq 1.8$ and $0 \leq b \leq 0.5$); $Li_aE_{1-b}B_bO_{2-c}D_c$ (where, $0.90 \leq a \leq 1.8$, $0 \leq b \leq 0.5$, and $0 \leq c \leq 0.05$); $LiE_{2-b}B_bO_{4-c}D_c$ (where, $0 \leq b \leq 0.5$ and $0 \leq c \leq 0.05$); $Li_aNi_{1-b-c}Co_bB_cD_\alpha$ (where, $0.90 \leq a \leq 1.8$, $0 \leq b \leq 0.5$, $0 \leq c \leq 0.05$, and $0 < \alpha \leq 2$); $Li_aNi_{1-b-c}Co_bB_cO_{2-\alpha}F_\alpha$ (where, $0.90 \leq a \leq 1.8$, $0 \leq b \leq 0.5$, $0 \leq c \leq 0.05$, and $0 < \alpha < 2$); $Li_aNi_{1-b-c}Co_bB_cO_{2-\alpha}F_2$ (where, $0.90 \leq a \leq 1.8$, $0 \leq b \leq 0.5$, $0 \leq c \leq 0.05$, and $0 < \alpha < 2$); $Li_aNi_{1-b-c}Mn_bB_cD_\alpha$ (where, $0.90 \leq a \leq 1.8$, $0 \leq b \leq 0.5$, $0 \leq c \leq 0.05$, and $0 < \alpha < 2$); $Li_aNi_{1-b-c}Mn_bB_cO_{2-\alpha}$ (where, $0.90 \leq a \leq 1.8$, $0 \leq b \leq 0.5$, $0 \leq c \leq 0.05$, and $0 < \alpha < 2$); $Li_aNi_{1-b-c}Mn_bB_cO_{2-\alpha}F_2$ (where, $0.90 \leq a \leq 1.8$, $0 \leq b \leq 0.5$, $0 \leq c \leq 0.05$, and $0 < \alpha < 2$); $Li_aNi_bE_cG_dO_2$ (where, $0.90 \leq a \leq 1.8$, $0 \leq b \leq 0.9$, $0 \leq c \leq 0.5$, and $0.001 \leq d \leq 0.1$); $Li_aNi_bCo_cMn_dGeO_2$ (where, $0.90 \leq a \leq 1.8$, $0 \leq b \leq 0.9$, $0 \leq c \leq 0.5$, $0 \leq d \leq 0.5$, and $0.001 \leq e \leq 0.1$); $Li_aNiG_bO_2$ (where, $0.90 \leq a \leq 1.8$ and $0.001 \leq b \leq 0.1$); $Li_aCoG_bO_2$ (where, $0.90 \leq a \leq 1.8$ and $0.001 \leq b \leq 0.1$); $Li_aMnG_bO_2$ (where, $0.90 \leq a \leq 1.8$ and $0.001 \leq b \leq 0.1$); $Li_aMn_2G_bO_4$ (where, $0.90 \leq a \leq 1.8$ and $0.001 \leq b \leq 0.1$); $QO_2$; $QS_2$; $LiQS_2$; $V_2O_5$; $LiV_2O_5$; $LiIO_2$; $LiNiVO_4$; $Li_{(3-f)}J_2(PO_4)_3(0 \leq f \leq 2)$; $Li_{(3-f)}Fe_2(PO_4)_3(0 \leq f \leq 2)$; and $LiFePO_4$ In the formulae above, A may be Ni, Co, Mn, or a combination thereof; B may be Al, Ni, Co, Mn, Cr, Fe, Mg, Sr, V, a rare earth element, or a combination thereof; D may be O, F, S, P, or a combination thereof; E may be Co, Mn, or a combination thereof; F may be F, S, P, or a combination thereof; G may be Al, Cr, Mn, Fe, Mg, La, Ce, Sr, V, or a combination thereof; Q may be Ti, Mo, Mn, or a combination thereof; I may be Cr, V, Fe, Sc, Y, or a combination thereof; J may be V, Cr, Mn, Co, Ni, Cu, or a combination thereof.

In some embodiments, the compound including a coating layer on a surface thereof or a mixture of the compound and the compound including a coating layer may be used. Here, the coating layer may include an oxide of a coating element, oxyhydroxide of a coating element, oxycarbonate of a coating element, or hydroxycarbonate of a coating element. Compounds that form these coating layers may be amorphous or crystalloid. The coating element included in the coating layer may be Mg, Al, Co, K, Na, Ca, Si, Ti, V, Sn, Ge, Ga, B, As, Zr, or a combination thereof. Any process (i.e., spray coating and dipping) that can form the coating layer using the compound with the above-described elements without affecting properties of the cathode active material may be used. The process may be easily understood by one of ordinary skill in the art, and thus a detailed description thereof will be omitted.

In some embodiments, $LiNiO_2$, $LiCoO_2$, $LiMn_xO_{2x}$ (x=1 or 2), $LiNi_{1-x}Mn_xO_2$ (0<x<1), $LiNi_{1-x-y}Co_xMn_yO_2$ ($0 \leq x \leq 0.5$, $0 \leq y \leq 0.5$), $LiFeO_2$, $V_2O_5$, $TiS$, or $MoS$ may be used as the compound for the cathode active material.

The conductor may be carbon black or graphite particles, but is not limited thereto. Any material that is available as a conducting agent in the art may be used.

Examples of the conducting materials are graphite such as natural graphite and artificial graphite; carbon black such as carbon black, acetylene black, Ketjen black, channel black, furnace black, lamp black, and thermal black; conductive fiber such as carbon fiber and metal fiber; metal powder such as fluorocarbon, aluminum, and nickel powder; conductive whiskey such as zinc oxide and potassium titanate; conductive metal oxide such as titanium oxide; and a conducting agent such as polyphenyl derivative.

Examples of the binder are vinylidene fluoride/hexafluoropropylene copolymer, polyvinylidene fluoride (PVDF), polyacrylonitrile, polymethylmetacrylate, polytetrafluoroethylene, a mixture thereof, and styrene-butadiene rubber-based polymer, but are not limited thereto. Any suitable binding agent may be used.

Examples of the solvent are N-methylpyrrolidone, acetone, and water, but are not limited thereto. Any material that is available in the art as a solvent may be used.

Here, the cathode active material, the conducting agent, the binder, and the solvent may have an amount corresponding to levels that are generally used in the manufacture of a lithium secondary battery. At least one of the conducting agent, the binder, and the solvent may be omitted, according to the use and the structure of the lithium secondary battery.

In some embodiments, a lithium secondary battery includes a cathode containing the cathode active material. In some embodiments, the lithium secondary battery may be manufactured in the following manner.

First, a cathode may be prepared according to the above-described cathode formation method.

Next, an anode active material, a conducting agent, a binder, and a solvent may be mixed to prepare an anode composition. The anode composition may be directly coated on a metal current collector and dried to form an anode plate. Alternatively, the anode active material composition may be cast on a separate support, and then an anode active material film separated from the support may be laminated on a metal current collector to prepare an anode plate.

Any suitable anode active material may be used in the art. For example, the anode active material may be lithium metal, a metal that is alloyable with lithium, a transition metal oxide, transition metal sulphide, a material that may dope or de-dope lithium, a material that may reversibly insert or eliminate a lithium ion, or a conductive polymer.

Examples of the transition oxide include but not limited to tungsten oxide, molybdenum oxide, titanium oxide, lithium titanium oxide, vanadium oxide, and lithium vanadium oxide. The transition oxide may be selected from the group consisting of Group XI of the periodic table of elements including $CuO$, $Cu_2O$, $Ag_2O$, $CuS$, and $CuSO_4$, Group IV and Group XIV of the periodic table of elements including $TiS_2$ and $SnO$, Group V and Group XV of the periodic table of elements including $V_2O_5$, $V_6O_{12}$, $VO_x(0<x<6)$, $Nb_2O_5$, $Bi_2O_3$, and $Sb_2O_3$, Group VI and Group XVI of the periodic table of elements including $CrO_3$, $Cr_2O_3$, $MoO_3$, $MoS_2$, $WO_3$, and $SeO_2$, Group VII of the periodic table of elements including $MnO_2$ and $Mn_2O_3$, Group VIII and Group IX of the periodic table of elements including $Fe_2O_3$, $FeO$, $Fe_3O_4$, $Ni_2O_3$, $NiO$, $CoO_3$, and $CoO$, and a compound represented by a typical formula $Li_xMN_yX_2$ (here, M and N may be metals belong to Groups I to VIII, X may be oxygen or sulfur, and $0.1 \leq x \leq 2$, and $0 \leq y \leq 1$), for example, lithium titanate represented by $Li_yTiO_2$ ($0 \leq y \leq 1$), $Li_{4+y}Ti_5O_{12}$ ($0 \leq y \leq 1$), or $Li_{4+y}Ti_{11}O_{20}$ ($0 \leq y \leq 1$).

Examples of the material that may dope and de-dope lithium are Si, $SiOx$ ($0<x \leq 2$), Si—Y alloy (here, Y may be an alkali metal, an alkali earth metal, an element of Group 13 of the periodic table of elements, and element of Group 14 of the periodic table of elements, a transition metal, a rare earth element, or a combination thereof, and Si may not be the same as above), Sn, $SnO_2$, Sn—Y (here, Y may be an alkali metal, an alkali earth metal, an element of Group 13 of the periodic table of elements, and element of Group 14 of the periodic table of elements, a transition metal, a rare earth element, or a combination thereof, and Sn may not be the same as above). Here, at least one of the above-described materials may be mixed with $SiO_2$. Element Y may be Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, or a combination thereof.

Examples of the material that is reversibly capable of inserting and/or eliminating are carbonaceous materials. Any carbonaceous anode active material that is generally used in the manufacture of a lithium secondary battery may be used. The carbonaceous material may include crystalline carbon, amorphous carbon, and mixtures thereof. Examples of the crystalline carbon are natural graphite that is in amorphous, plate, flake, spherical, or fibrous form; or artificial graphite. Examples of the amorphous carbon are soft carbon (carbon sintered at low temperatures), hard carbon, meso-phase pitch carbides, and sintered corks.

Examples of the conductive copolymer are disulfide, polypyrrole, polyaniline, polyparaphenylene, polyecetylene, and polyacenic material.

In the anode active material composition, the conducting agent, the binder, and the solvent may be used the same as those of the cathode active material composition. Meanwhile, a plasticizer may be further added into the cathode active material composition and/or the anode active material composition to form an electrode plate with pores therein.

The anode active material, the conducting agent, the binder, and the solvent may have an amount that corresponds to levels that are generally used in the manufacture of a lithium secondary battery. At least one of the conducting agent, the binder, and the solvent may be omitted, according to a use and a structure of the lithium secondary battery.

Next, a separator to be disposed between the cathode and the anode may be prepared. The separator may include any suitable separator that is commonly used in lithium secondary batteries. The separator may have low resistance to migration of ions in an electrolyte and may have an excellent electrolyte-retaining ability. Examples of materials for forming the separator may be selected from the group consisting of glass fiber, polyester, Teflon, polyethylene, polypropylene, polytetrafluoroethylene (PTFE), and a combination thereof, and each of which may be a non-woven or woven fabric. For example, a rollable separator including polyethylene or polypropylene may be used for a lithium ion battery. A separator with a good organic electrolyte solution-retaining ability may be used for a lithium ion polymer battery. For example, the separator may be manufacture in the following manner.

In some embodiments, a polymer resin, a filler, and a solvent may be mixed together to prepare a separator composition. Then, the separator composition may be directly coated on an electrode, and then dried to form the separator. Alternatively, the separator composition may be cast on a support and then dried to form a separator film, which may then be separated from the support and laminated on an electrode to form the separator.

In some embodiments, the polymer resin used to manufacture the separator may include any suitable material that is commonly used as a binder for electrode plates. Examples of the polymer resin may include a vinylidenefluoride/hexafluoropropylene copolymer, polyvinylidene fluoride (PVDF), polyacrylonitrile, polymethylmethacrylate and a mixture thereof.

Next, an electrolyte may be prepared.

For example, the electrolytic solution may include an organic electrolyte solution. The organic electrolyte solution may be prepared by dissolving a lithium salt in an organic solvent.

The organic solvent may include any suitable organic solvent available in the art. Examples of the organic solvent include but are not limited to propylene carbonate, ethylene carbonate, fluoroethylene carbonate, butylene carbonate, dimethyl carbonate, diethyl carbonate, methylethyl carbonate, methylpropyl carbonate, ethylpropyl carbonate, methylisopropyl carbonate, dipropyl carbonate, dibutyl carbonate, benzonitrile, acetonitrile, tetrahydrofuran, 2-methyltetrahydrofuran, γ-butyrolactone, dioxolane, 4-methyldioxolane, N,N-dimethyl formamide, dimethyl acetamide, dimethylsulfoxide, dioxane, 1,2-dimethoxyethane, sulforane, dichloroethane, chlorobenzene, nitrobenzene, diethylene glycol, dimethyl ether, and mixtures thereof.

The lithium salt may include any suitable lithium salt available in the art. Examples of the lithium salt are $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ (where, x and y are each independently a natural number), LiCl, LiI, and a mixture thereof.

In addition, the electrolyte may be a solid electrolyte including an organic solid electrolyte and an inorganic solid electrolyte. When the solid electrolyte is used, a separator film may be used therewith.

Examples of the organic solid electrolyte include but are not limited to a polyethylene derivative, a polyethylene oxide derivative, a polypropylene oxide derivative, a phosphate ester polymer, poly agitation lysine, polyester sulfide, polyvinyl alcohol, polyfluoro vinylidene, and a polymer including ionic dis sociable group Examples of the inorganic solid electrolyte include but are not limited to a boronic oxide and lithium oxynitride, but are not limited thereto. Any suitable material available as a solid electrolyte in the art may be used. The solid electrolyte may be formed on the anode by sputtering or the like. For example, Li nitride such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, and $Li_3PO_4$—$Li_2S$—$SiS_2$ may be used.

Referring to FIG. 1A, a lithium secondary battery 1 may include a cathode 3, an anode 2, and a separator 4. The cathode 3, the anode 2, and the separator 4 may be wounded or folded, and then provided in a battery case 5. Then, the battery case 5 may be filled with an organic electrolyte solution and sealed with a cap assembly 6, thereby completing the manufacture process of the lithium secondary battery 1. The battery case 5 may be a cylindrical type, a rectangular type, or a thin-film type. For example, the lithium secondary battery may be a thin-film type battery. The lithium secondary battery may be a lithium ion battery The separator may be interposed between the cathode and the anode to form an electrode assembly. The electrode assembly may be stacked in a bi-cell structure and impregnated with the organic electrolyte solution. The resultant may be put into a pouch and hermetically sealed, thereby completing manufacture of a lithium ion polymer battery.

In some embodiments, a plurality of battery assemblies may be stacked to form a series-connected battery pack, which may be used in any device that requires high capacity and high output, e.g., in a laptop computer, a smart phone, and electric vehicle.

The lithium secondary battery may have high-temperature cycle characteristics and high-temperature stability, and thus may be suitable for large energy storage devices. For example, the lithium secondary battery may be applicable as a power source for an electric vehicle (EV) or a hybrid vehicle such as a plug-in hybrid electric vehicle (PHEV).

Hereinafter, one or more embodiments will be described in detail with reference to the following examples. However, these examples are not intended to limit the purpose and scope of the invention.

Preparation Example 1

Preparation of Cathode Active Material $NiSO_4$ as a nickel precursor, $CoSO_4$ as a cobalt precursor, and $MnSO_4$ as a manganese precursor were mixed together in a mole ratio of 0.5:0.2:0.3 in water to prepare an NiCoMn (NCM) hydroxide precursor aqueous solution. While the aqueous solution was stirred, a sodium hydroxide aqueous solution was slowly added thereto. The reaction mixture was then stirred for 5 hours to neutralize the NCM hydroxide precursor aqueous solution, and the NCM hydroxide ($Ni_{0.5}Co_{0.2}Mn_{0.3}(OH)_2$) was precipitated. The resultant was filtered and then washed to obtain a precipitate. The precipitate was dried in an air atmosphere at a temperature of 80° C. to obtain $Ni_{0.5}Co_{0.2}Mn_{0.3}(OH)_2$ powder formed of small particles having an average particle diameter of 6 μm.

The $Ni_{0.5}Co_{0.2}Mn_{0.3}(OH)_2$ powder was heat treated in an air atmosphere at a temperature of 600° C. for 1 hour to remove moisture. Then, a nickel transition metal oxide, which was formed in a shape that easily allows lithium penetration, was obtained.

The nickel transition metal oxide and the lithium precursor ($Li_2CO_3$) were prepared to have a mole ratio of 1:0.525. Here, a weight ratio of lithium with respect to each of the transition metals nickel, cobalt, and manganese was set to be about 1.05.

The prepared precursors were induced to mix together, and the mixture was put into a furnace. Here, a second heat treatment was performed at a temperature of 1,040° C. for 10 hours by flowing $O_2$ thereto to prepare a cathode active material.

The cathode active material obtained according to the above-described method was $Li[Ni_{0.5}Co_{0.2}Mn_{0.3}]O_2$. An average particle diameter of the primary particles, which are single particles of the cathode active material, was 4 μm, and the secondary particles were small particles having an average particle diameter of 6 μm.

The average particle diameter of the primary particles of the cathode active material was measured using a scanning electron microscope (SEM) [FEI Sirion, Oreg., US], and the average particle diameter of the secondary particles was measured using a particle size analyzer [Beckman Coulter LS13 320, Pasadena, Calif., US].

Preparation Example 2

Preparation of Cathode Active Material

A cathode active material was prepared in the same manner as Preparation Example 1, except that the mixture was stirred for 9.5 hours to obtain $Ni_{0.5}Co_{0.2}Mn_{0.3}(OH)_2$, $Ni_{0.5}Co_{0.2}Mn_{0.3}(OH)_2$ powder formed of large particles having an average particle diameter of 15 μm was obtained instead of $Ni_{0.5}Co_{0.2}Mn_{0.3}(OH)_2$ formed of small particles having an average particle diameter of 6 μm, and the secondary particles of the cathode active material were large particles having an average particle diameter of 15 μm instead of small particles having an average particle diameter of 6 μm.

Preparation Example 3

Preparation of Cathode Active Material

The cathode active materials of Preparation Examples 1 and 2 were mixed at a weight ratio of 20:80. Then, a cathode active material $Li[Ni_{0.5}Co_{0.2}Mn_{0.3}]O_2$ formed of the primary particles having an average particle diameter of 4 μm, and the secondary particles including small particles having an average particle diameter of 6 μm and large particles having an average particle diameter of 15 μm, was obtained.

Comparative Example 1

Preparation of Cathode Active Material

A cathode active material was prepared in the same manner as in Preparation Example 1, except that a second heat treatment was performed at a temperature of 940° C.

Comparative Example 2

Preparation of Cathode Active Material

A cathode active material was prepared in the same manner as in Preparation Example 1, except that a second heat treatment was performed at a temperature of 980° C.

Comparative Example 3

Commercially Available 523 NCM

Small particles $Li[Ni_{0.5}Co_{0.2}Mn_{0.3}]O_2$ having an average particle diameter of 6 μm were used as a cathode active material.

Comparative Example 4

Commercially Available 523 NC

N11C (available from Samsung SDI), which was formed of large particles $Li[Ni_{0.5}Co_{0.2}Mn_{0.3}]O_2$ having an average particle diameter of 11 μm, was used as a cathode material.

Example 1

Manufacture of Cathode and Lithium Secondary Battery (Coin Cell)

The cathode active material powder of Preparation Example 1 and a carbonaceous conducting agent (Super P) were uniformly mixed at a weight ratio of 97:1.5, and a polyvinylidene fluoride (PVDF) binder solution was added thereto at a weight ratio of the active material:carbonaceous conducting agent:binder to be 97:1.5:1.5, to prepare an active material slurry. The slurry was coated on a 15 μm thick Al current collector to a thickness of 90 μm using a doctor blade. The result product was dried at a temperature of 120° C. for 1 hour or longer, followed by a rolling process to manufacture a cathode having a thickness of 70 μm.

A lithium metal as a counter electrode, the cathode, and a polyethylene separator (STAR 20, Asahi) and an electrolytic solution were used to manufacture a 2032 sized coin cell.

1.3M $LiPF_6$ solution was used as the electrolytic solution. 1.3M $LiPF_6$ solution was prepared by dissolving $LiPF_6$ in a mixed solvent of ethylene carbonate (EC), ethylmethyl carbonate (EMC), and dimethyl carbonate (DMC) (volume ratio of 3:3:4).

Examples 2-3

Cathodes and lithium batteries were manufactured in the same manner as in Example 1, except that the cathode active materials of Preparation Examples 2-3 were used instead of the cathode active material of Example 1, respectively.

Comparative Examples 1-4

Cathodes and lithium batteries were manufactured in the same manner as in Example 1, except that the cathode active materials of Comparative Preparation Examples 1-4, instead of the cathode active material of Preparation Example 1, were used, respectively.

Example 4

Preparation of Cathode and Lithium Secondary Battery (Full Cell)

The cathode active material powder of Preparation Example 1 and another cathode active material powder $LiCoO_2$ (CM15V available from Samsung SDI Co., Ltd) having an average particle diameter of 16 μm were mixed at a weight ratio of 20:80, and then the carbonaceous conducting agent (Super P) were uniformly mixed with the mixture at a weight ratio of 97:1.5. The PVDF binder solution was added thereto at a weight ratio of the active materials:carbonaceous conducting agent:binder of 97:1.5:1.5, to prepare an active material slurry. The slurry was coated on a 12 μm thick Al current collector using a thick-film coating device to have a loading level of 40 mg/cm². Then, the result product was dried at a temperature of 120° C. for about 1 hour or longer, followed by a rolling process to manufacture a cathode having a mixture density of 3.95 g/cm³.

An anode active material, graphite powder (Japan carbon), and a mixture of styrene butadiene rubber (SBR) and carboxymethyl cellulose (CMC) mixed in a weight ratio of 1:1 were mixed in a weight ratio of 98:2, to prepare an anode active material slurry.

The anode active material slurry was coated on a 8 μm thick copper foil current collector to an amount of 16 mg/cm². A plate in which the coating was completed was dried at a temperature of 100° C. for 1 hour or longer, followed by a rolling process to manufacture an anode having a mixture density of 1.6 g/cm³.

The cathode, the anode, and the polyethylene separator (STAR 20, Asahi) were used, and a solution electrolyte in which 1.15 M of $LiPF_6$ is dissolved in a mixed solvent of EC, EMC, and DMC (volume ratio of 3:3:4) was used to manufacture a polymer-type lithium ion secondary battery (that is, a full cell) having 2,000 mAh capacity.

Example 5

A polymer-type lithium ion secondary battery (that is, a full cell) having 2,000 mAh capacity was manufactured in the same manner as in Example 4, except that the anode active material was a mixed plate in which graphite powder and SiOx (where, 0<x<2) (ShinEtsu) were mixed at a weight ratio of 95:5, instead of graphite powder.

Example 6

A polymer-type lithium ion secondary battery (that is, a full cell) having 2,000 mAh capacity was manufactured in the same manner as in Example 4, except that the cathode active material of Preparation Example 2 was used instead of the cathode active material of Preparation Example 1, and the anode active material was an anode including a mixture in which graphite powder and SiOx (where, 0<x≤2) were mixed at a weight ratio of 80:20 was used instead of the anode active material of Example 4.

Comparative Example 5

A polymer-type lithium ion secondary battery (that is, a full cell) having 2,000 mAh capacity was manufactured in the same manner as in Example 4, except that the cathode active material of Comparative Preparation Example 3 was used instead of the cathode active material of Preparation Example 1.

Comparative Example 6

A polymer-type lithium ion secondary battery (that is, a full cell) having 2,000 mAh capacity was manufactured in the same manner as in Example 6, except that the cathode active material of Comparative Preparation Example 4 was used instead of the cathode active material of Preparation Example 2.

Evaluation Example 1

SEM Test

SEM images were measured with respect to particles of the Ni-based transition metal oxide in which the first heat treatment has been completed according to Preparation Examples 1 and 2, the cathode active material of Preparation Examples 1 and 2, and the cathode active material of Comparative Examples 1-4. An SEM analysis device is Sirion available from FEI (U.S.A).

Figure 1B:
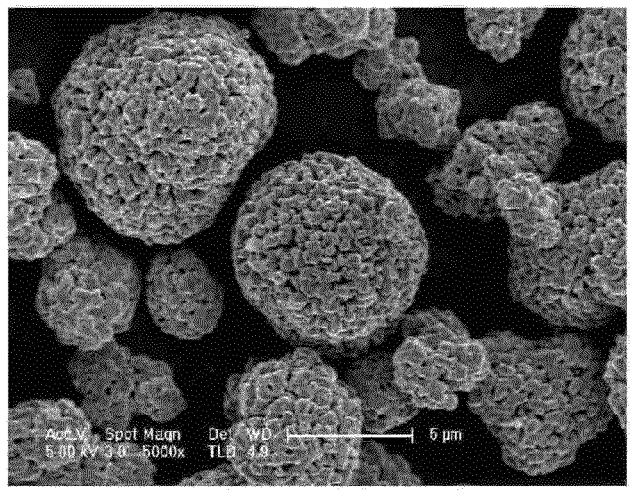
FIG. 1B is a scanning electron microscope (SEM) image of a nickel transition metal oxide after performing a first heat treatment according to Preparation Example 2.
Figure 1C:
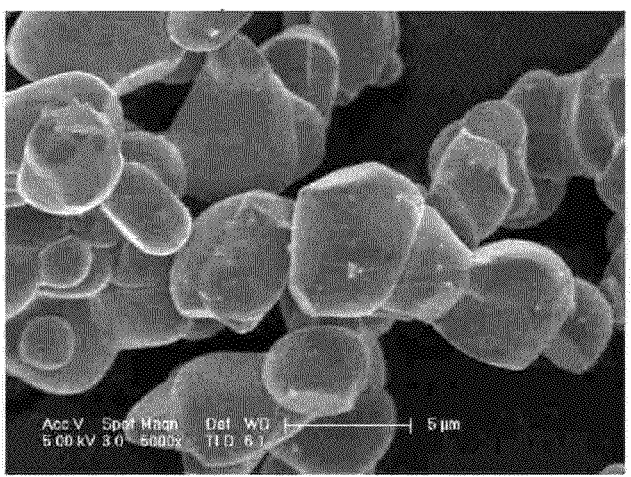
FIG. 1C is a SEM image of a cathode active material according to Preparation Example 1.
Figure 1D:
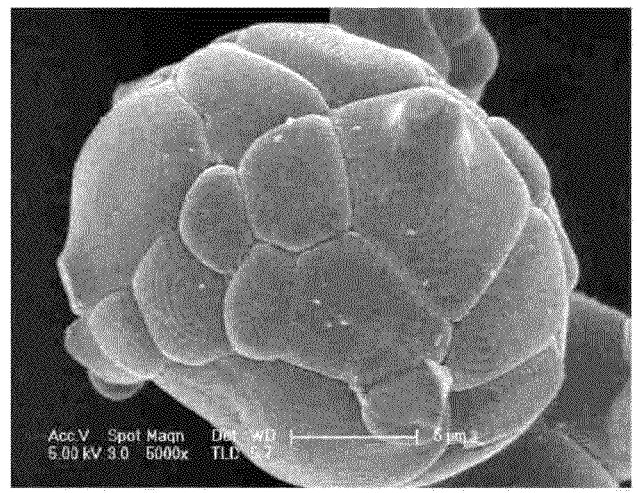
FIG. 1D is a SEM image of a cathode active material according to Preparation Example 2.

FIG. 1B is an SEM image of the Ni-based transition metal oxide in which the first heat treatment has been completed according to the steps in Preparation Example 2, FIG. 1C is an SEM image of the cathode active material of Preparation Example 1, and FIG. 1D is an SEM image of cathode active material of Preparation Example 2.

FIGS. 2A, 2B, 2C, and 2D are SEM images of the prepared cathode active material of Comparative Preparation Examples 1, 2, 3, and 4, respectively.

Figure 2A:
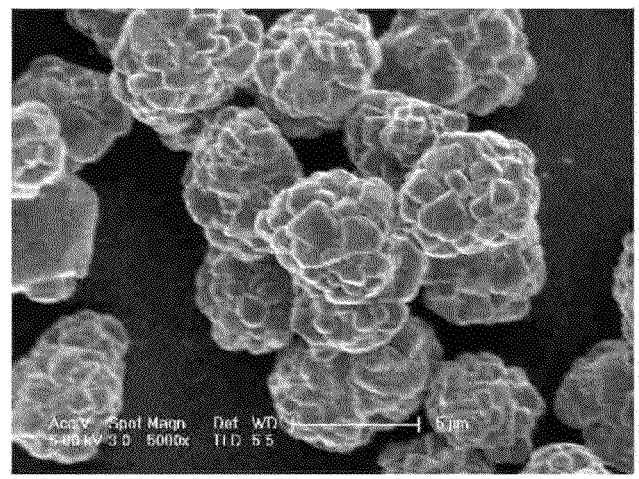
FIG. 2A is a SEM image of a cathode active material according to Comparative Preparation Example 1.
Figure 2B:
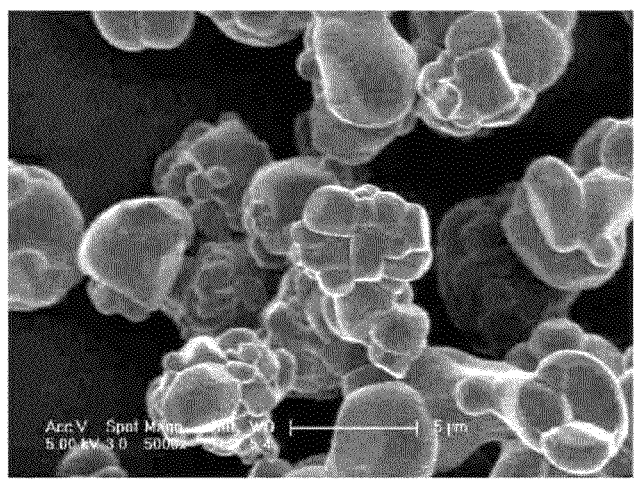
FIG. 2B is a SEM image of a cathode active material according to Comparative Preparation Example 2.
Figure 2C:
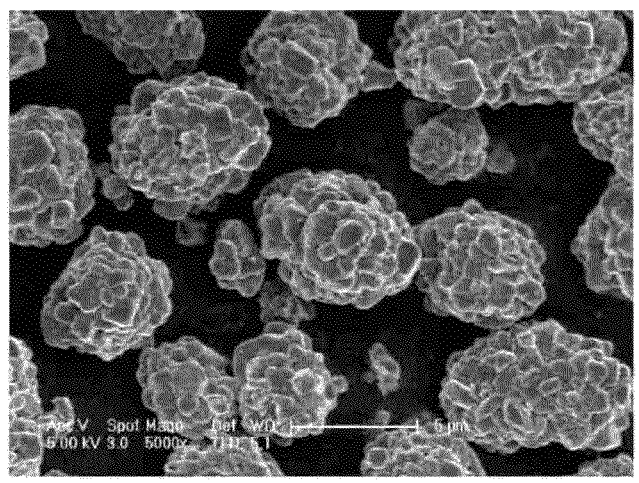
FIG. 2C is a SEM image of a cathode active material according to Comparative Preparation Example 3.
Figure 2D:
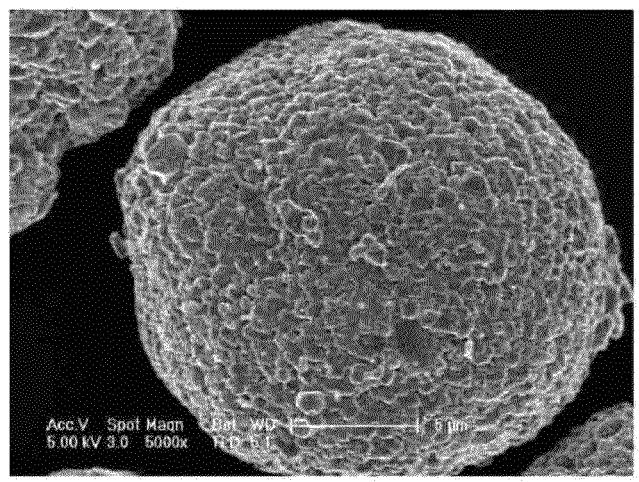
FIG. 2D is a SEM image of a cathode active material according to Comparative Preparation Example 4.
Figure 3A:
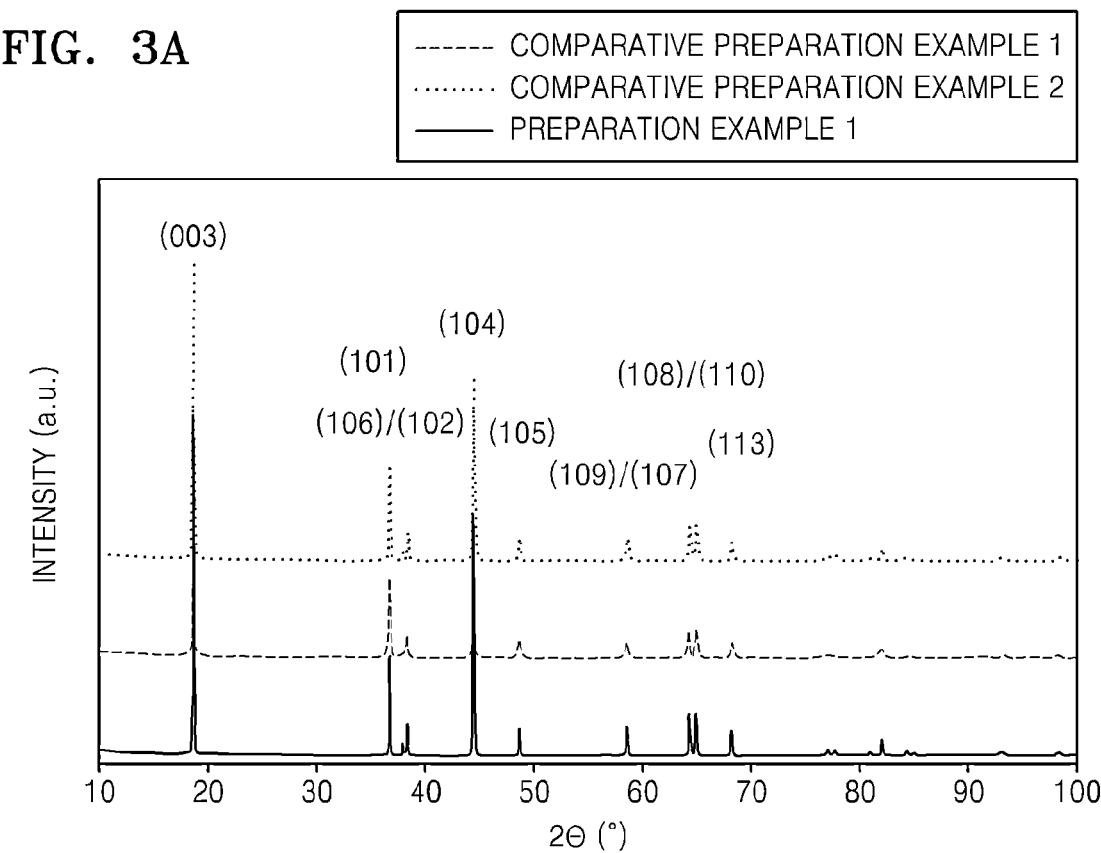
FIGS. 3A to 3D are graphs showing analysis results of X-ray diffraction (XRD) of cathode active materials according to Preparation Example 1 and Comparative Preparation Examples 1 and 2.
Figure 3B:
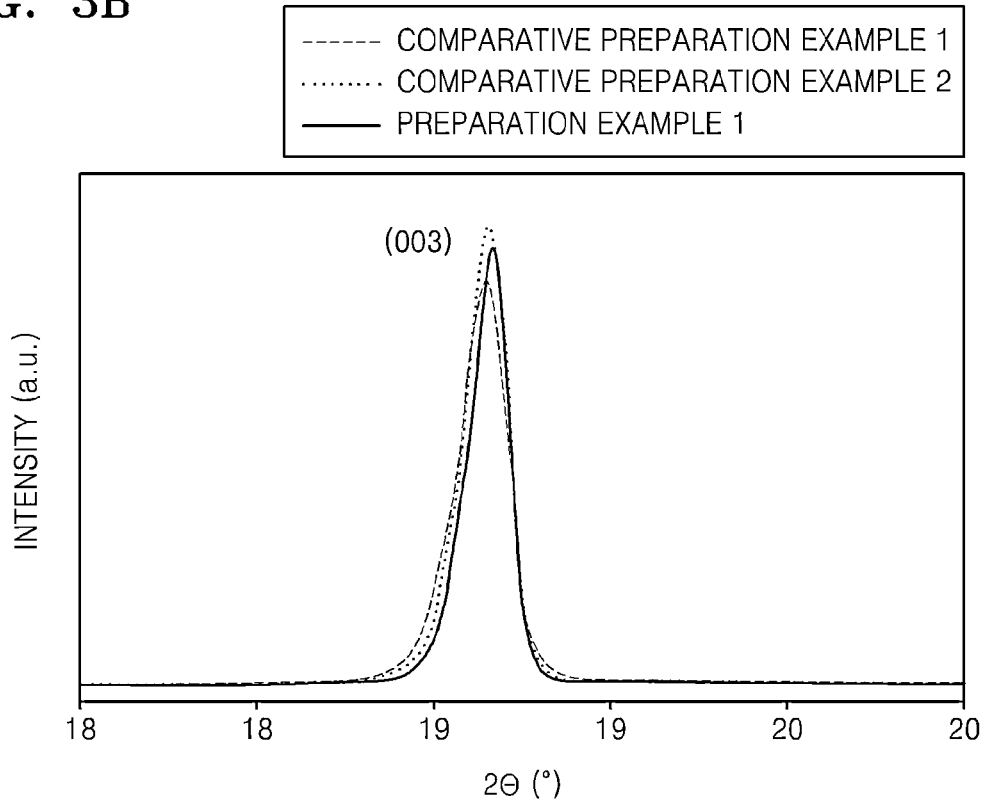
Figure 3C:
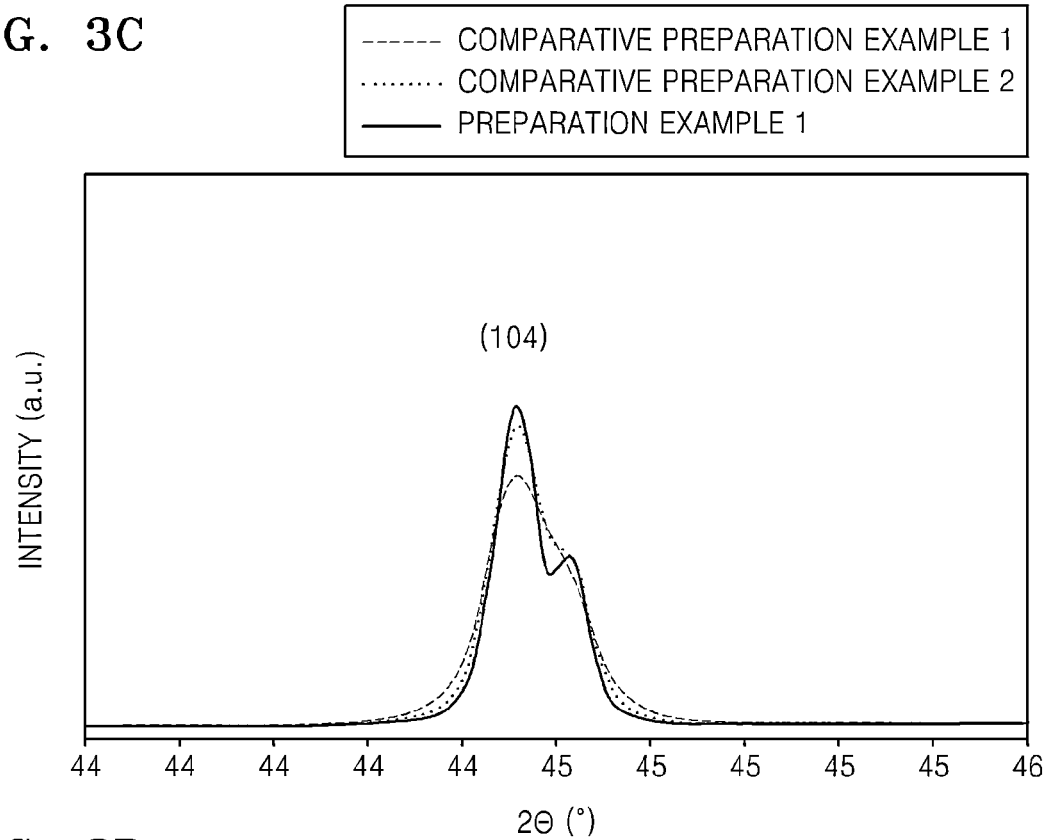
Figure 3D:
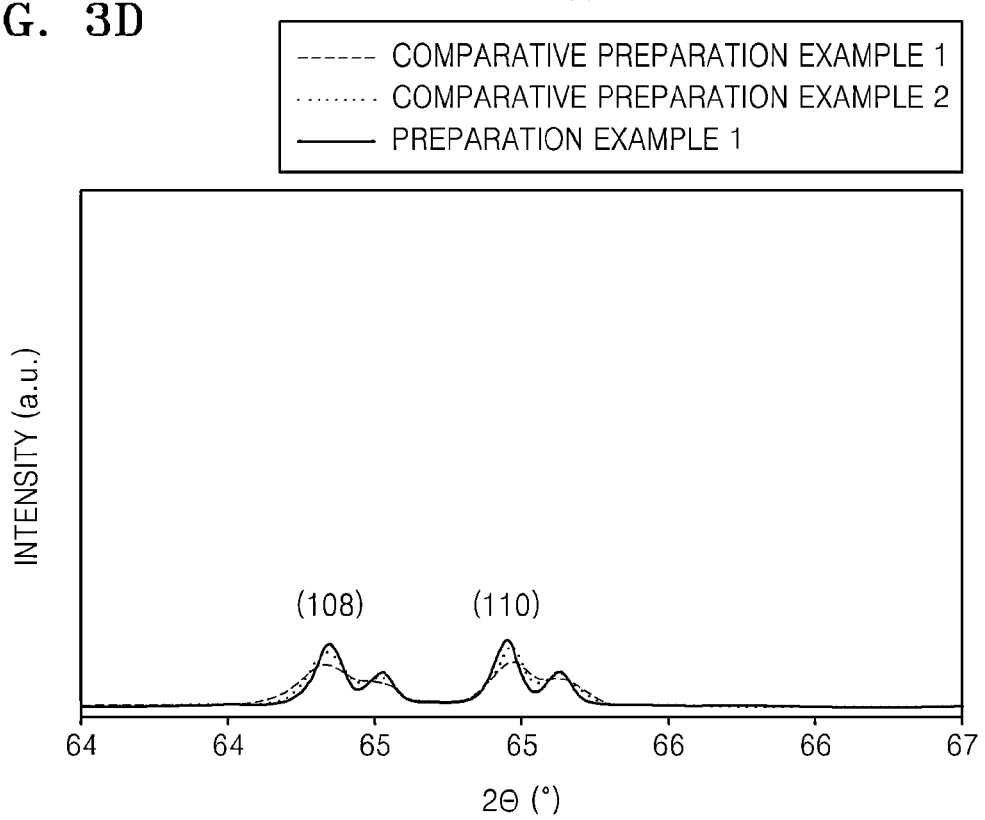

In this regard, the average particle diameters of the primary and secondary particles of the cathode active materials of Preparation Example 1 shown in FIG. 1C were found to be increased compared to those of the cathode active materials of Comparative Preparation Examples 2 and 3 shown in FIGS. 2A and 2B In addition, referring to FIGS. 2C and 2D, the Ni-based lithium transition oxides that are cathode active materials of Comparative Preparation Examples 3 and 4 were found to include primary particles having a particle average diameter of 1 μm in which the primary particles were gathered to form the secondary particles.

Evaluation Example 2

Measurement of pH Value and Residual Lithium

The pH values of the cathode active materials of Preparation Example 1 and Comparative Preparation Examples 1 to 3 were measured, and results thereof are shown in Table 1 below. The pH values were evaluated using a pH meter [Eutech, pH 6000] after stiffing 2 g of the cathode active material in 100 g of pure water.

The amount of residual lithium in the cathode active materials of Preparation Example 1 and Comparative Examples 1 to 3 were measured, and results thereof are shown in Table 1 below. The residual lithium was evaluated using a titration method. The cathode active material powder was dissolved in water, and then titrated with hydrochloric acid to calculate amounts of LiOH and $Li_2CO_3$ included in the cathode active material powder. Based on the calculation, the amounts of LiOH and $Li_2CO_3$ left on the surface of the cathode active materials were measured.

Meanwhile, in order to confirm amounts of lithium carbonate in the cathode active materials of Preparation Example 1 and Comparative Examples 1 to 3, GC-MS [gas chromatograph-mass spectrometer, Agilent 7000, Santa Clara, Calif., US] analysis was performed, and results thereof are shown in Table 1 below.

TABLE 1

| Division | pH | Residual lithium (wt %) LiOH | Residual lithium (wt %) $Li_2CO_3$ | Amount of lithium carbonate measured by GC-MS analysis (wt %) |
|---|---|---|---|---|
| Comparative Preparation Example 1 | 10.8 | 0.065 | 0.120 | 0.08 |
| Comparative Preparation Example 2 | 10.5 | 0.044 | 0.105 | 0.05 |
| Comparative Preparation Example 3 | 11.1 | 0.086 | 0.135 | 0.09 |
| Preparation Example 1 | 10.3 | 0.02 | 0.085 | 0.03 |

Referring to Table 1 above, the amount of the residual lithium compounds in the cathode active material of Preparation Example 1 were found to be small compared to those in the cathode active materials in Comparative Examples 1 to 3. Such a decreased amount of the residual lithium compounds was also confirmed by the decreased pH of the active materials. When the cathode slurry was manufactured, the decreased pH on the surface of the active materials may contribute to improvement of stability of the slurry and prevention of problems such as bump of the electrode plate which may occur during the coating.

Evaluation Example 3

XRD Test

The cathode active material powders of Preparation Example 1 and Comparative Preparation Examples 1 and 2 were evaluated by XRD analysis.

The XRD analysis was carried out by using an analysis device Xpert PRO (Philips/Power 3 kW), followed by Rietveld analysis. Results thereof are shown in FIGS. 3A to 3D and Table 2 below. In this regard, a CuK-alpha characteristic X-ray wavelength of 1.541 Å was used as a radiation source.

TABLE 2

| Division | a (Å) | c (Å) | c/a | Unit cell volume (V) (Å3) | Ni of Li site (atom %) | FWHM at 003 peak (deg.) | FWHM at 104 peak (deg.) | FWHM at 110 peak (deg.) |
|---|---|---|---|---|---|---|---|---|
| Comparative Preparation Example 1 | 2.867 | 14.228 | 4.963 | 101.41 | 1.3 | 0.138 | 0.141 | 0.162 |
| Comparative Preparation Example 2 | 2.868 | 14.236 | 4.964 | 101.40 | 1.1 | 0.135 | 0.133 | 0.155 |
| Preparation Example 1 | 2.868 | 14.228 | 4.961 | 101.38 | 0.0 | 0.121 | 0.109 | 0.112 |

Referring to Table 2 above, the cathode active materials of Preparation Example 1 and Comparative Preparation Examples 1 and 2 were found to have a hexagonal crystal structure R-3m. In addition, as the temperature of the second heat treatment (that is, the sintering temperature) was increased, a (Å) values tend to be similar to each other while c (Å) values tend to be decreased. The unit cell volume is decreased according to the changes above. The amount of nickel substituted on a Li site, which represents cation mixing, was decreased as the temperature of the second heat treatment increased. Thus, the cation mixing did not occur at a temperature of 1,040° C.

The second heat treatment temperature of the cathode active material of Preparation Example 1 is higher than that of the cathode active materials of Comparative Preparation Examples 1 and 2. In the same manner, the FWHM decreases with increasing temperature of the second heat treatment. That is, the crystallinity of the cathode active material also increases.

Evaluation Example 4

DSC Test

Figure 4:
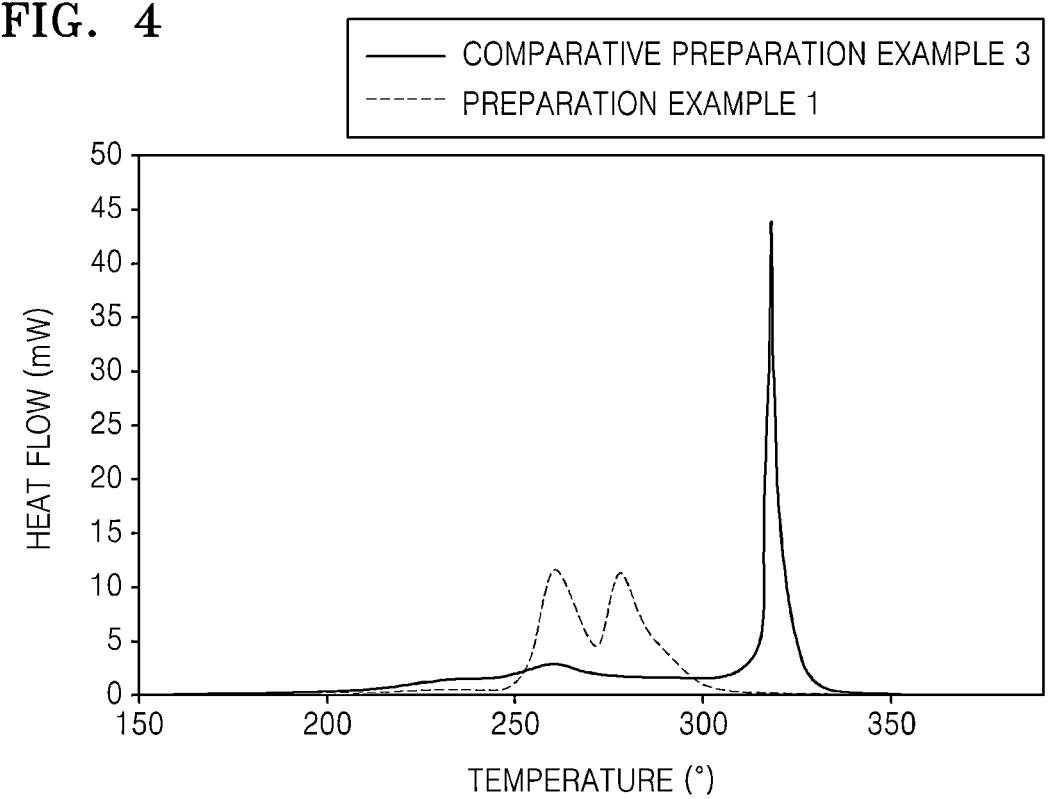
FIG. 4 is a graph showing analysis results of differential scanning calorimetry (DSC) of cathode active materials according to Preparation Example 1 and Comparative Preparation Example 3.

Thermal stabilities of the cathode active materials of Preparation Example 1 and Comparative Preparation Example 3 were analyzed using differential scanning calorimetry (DSC), and results thereof are shown in FIG. 4.

Referring to FIG. 4, the temperature of an onset point of the cathode active material of Preparation Example 1 was found to be increased compared to that of the commercially available cathode active material of Comparative Preparation Example 3, and a calorimetric value at a primary peak is decreased in the cathode active material of Preparation Example 1, resulting in a broad peak. Here, the cathode active material of Preparation Example 1 was found to have excellent stability.

Evaluation Example 5

High-Temperature Storage Test

1) A Metal Elusion Test According to Storage at 60° C. For 1 Week after a Full Charge The coin cells of Examples 1 and 2, and Comparative Examples 3 and 4 were charged under conditions of a constant current at a current of 0.2 C until their voltage reached 4.45 V (with respect to Li) at a temperature of 25° C. Next, the coin cells were disassembled, and the cathode was put into a pouch containing an electrolyte solution and then was hermetically sealed. The pouch was stored at a temperature of 60° C. for 1 week, and the amounts of dissolved nickel, cobalt, and manganese metals were measured using Inductively Coupled Plasma-Atomic Emission Spectroscopy (ICP-AES) (Varian)

Results thereof are shown in Table 3 below.

TABLE 3

| Division | Ni | Co mg/L | Mn |
|---|---|---|---|
| Comparative Example 3 | 59 | 16 | 25 |
| Comparative Example 4 | 23 | n.d | 7 |
| Example 1 | n.d | n.d | n.d |
| Example 2 | n.d | n.d | n.d |

In Table 3 above, "n.d." indicates that the amount of elution is less than 5 mg/L Referring to Table 3, the charged cathodes of Examples 1 and 2 were found to have significantly decreased amounts of Ni, Co, and Mn elution, compared to the charge cathode plates of Comparative Examples 3 and 4.

2) Volume Changes According to Storage Time at a Temperature of 85° C. After a Full Charge The coin cells of Example 1 and Comparative Examples 3 and 4 were charged under conditions of a current of 0.2 C until their voltage reached 4.45 V (with respect to Li) at a temperature of 25° C. Next, the coin cells were disassembled, and the cathode was put into a pouch containing an electrolyte solution and then was hermetically sealed. The pouch was stored at a temperature of 85° C. for 1 week. Volume changes of the pouch according to storage time were measured using the Archimedes method.

The Archimedes method refers to a method of quantifying volume changes of the pouch according to storage time based on the Archimedes Principle, wherein the fully charged coin cells were disassembled and the cathode plate was put into a pouch containing an electrolytic solution and then was hermetically sealed.

Figure 5:
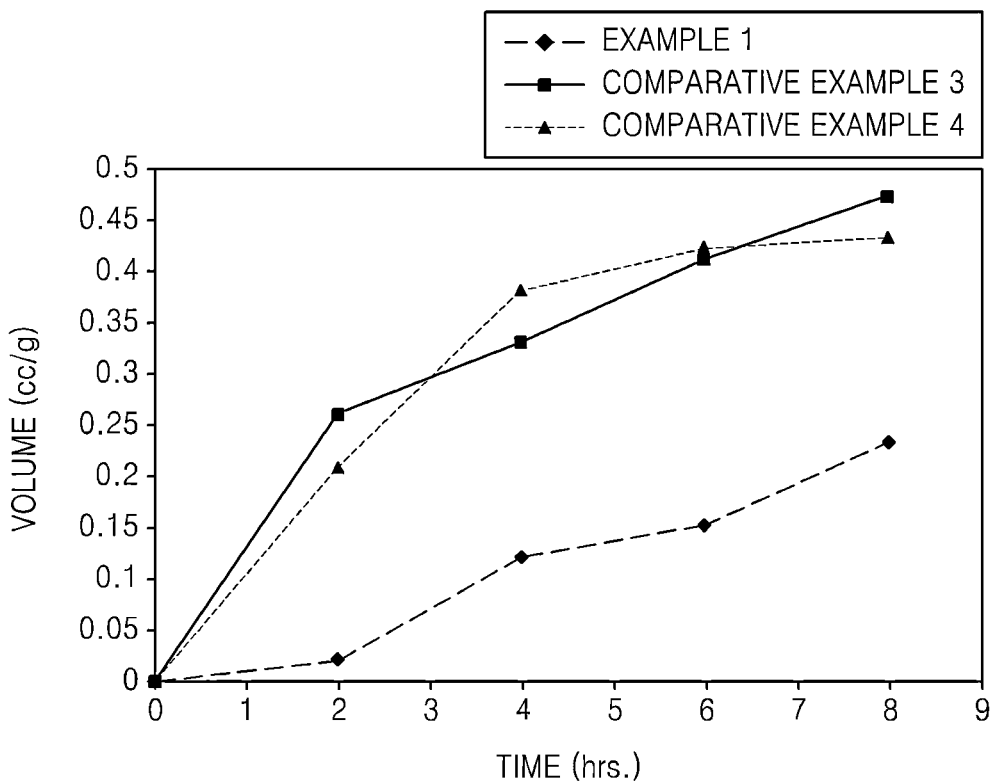
FIG. 5 is a graph showing volume changes according to time at a temperature of 85° C. after performing a full charge on coin cells according to Example 1 and Comparative Examples 3 and 4.

Results thereof are shown in FIG. 5

Referring to FIG. 5, the cathode of Example 1 was found to have less volume changes in high-temperature storage than those of Comparative Examples 3 and 4. That is, a smaller amount of gas was generated during the high-temperature storage.

Evaluation Example 6

Strength Test of Cathode Active Material 3 g of the cathode active materials of Preparation Example 1 and Comparative Preparation Example 1 were each filled in a circular 10 Φ size mold, and a pressure of 4 tons was applied thereto to test breaking strength. Images before and after compression were examined.

Figure 6A:
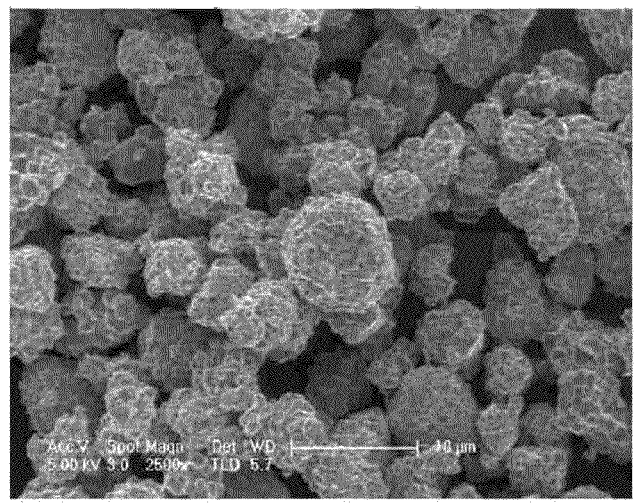
FIG. 6A is a SEM image of a cathode active material before applying a pressure of 4 tons according to Example 1.
Figure 6B:
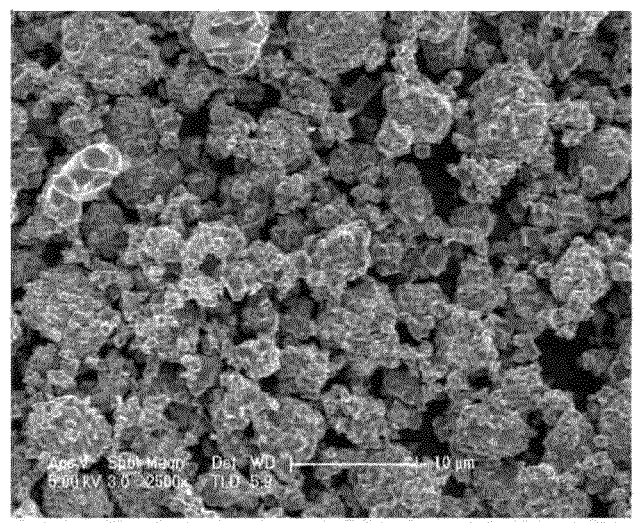
FIG. 6B is a SEM image of a cathode active material after applying a pressure of 4 tons according to Example 1.
Figure 7A:
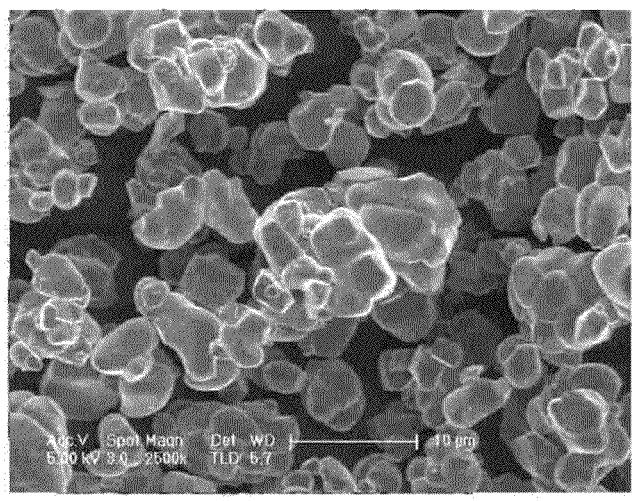
FIG. 7A is a SEM image of a cathode active material before applying a pressure of 4 tons according to Comparative Preparation Example 1.
Figure 7B:
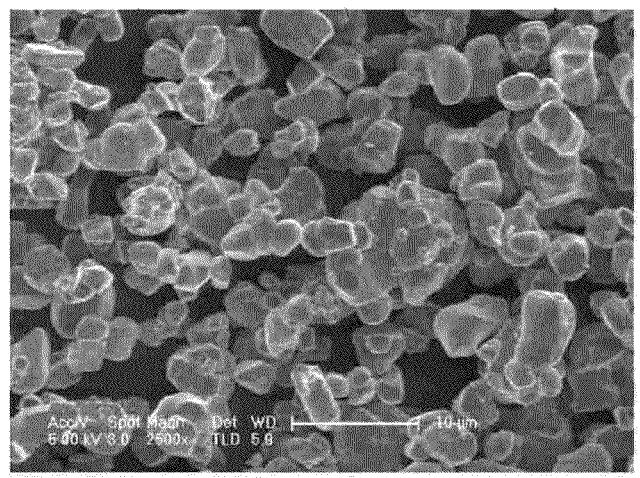
FIG. 7B is a SEM image of a cathode active material after applying a pressure of 4 ton according to Comparative Preparation Example 1.

FIGS. 6A and 6B are images of the cathode active material of Preparation Example 1 before and after applying a pressure of 4 tons thereto, respectively. FIGS. 7A and 7B are images of the cathode active material of Comparative Preparation Example 1 before and after applying a pressure of 4 tons thereto, respectively.

In this regard, the cathode active material of Comparative Preparation Example 1 was found to be easier to break than that of Preparation Example 1. The breaking of the cathode active material is associated with the extent of the breaking when high pressure was applied thereto during the rolling process performed on the plate. Thus, a specific surface area of the cathode active material after applying a pressure thereto is increased compared to that of the cathode active material before applying a pressure thereto. As a result, the cell characteristics are degraded.

In Table 4 below, changes of the specific surface areas of the cathode active materials of Preparation Example 1 and Comparative Preparation Example 1 before and after applying a pressure thereto are shown.

TABLE 4

| Division | Specific surface area of the cathode active material before applying a pressure (m$^2$/g) | Specific surface area of the cathode active material after applying a pressure (m$^2$/g) |
|---|---|---|
| Preparation Example 1 | 0.366 | 0.532 |
| Comparative Preparation Example 1 | 0.650 | 1.182 |

Referring to Table 4, the difference in the surface specific areas of the cathode active material of Preparation Example 1 before and after applying a pressure is found to be decreased compared to the difference in the surface specific areas of the cathode active material of Comparative Preparation Example 1 before and after applying a pressure. Thus, the strength of the cathode active material of Preparation Example 1 was found to be better than that of the cathode active material of Comparative Preparation Example 1

Evaluation Example 7

Measurement of Mixture Density of Cathode

The cathode active material layers included in the cathodes of Examples 3 and 5 and Comparative Examples 5 and 6 were rolled and cut into a size of 30 mm×30 mm to measure a mixture density by measuring a thickness and weight thereof. In addition, cathodes having the same loading level as the above-described cathodes were rolled and bent by compressing them at a greater pressure to examine their bending characteristics. The cathodes that were rolled at each pressure above were dried in a vacuum drier at a temperature of 100° C. for 10 hours, and then evaluated in terms of bending characteristics. Results thereof are shown in FIGS. 8 and 9, and the mixture density of the cathodes before and after performing the rolling process are shown in Table 5 below.

Figure 8:
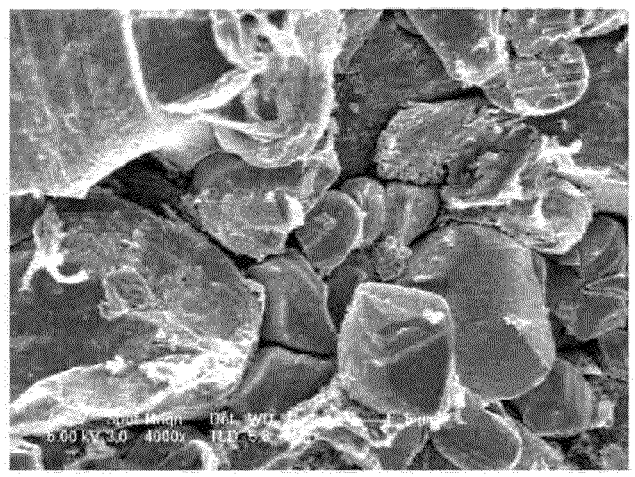
FIG. 8 is a SEM image of a cathode in a state before rolling according to Example 3.
Figure 9:
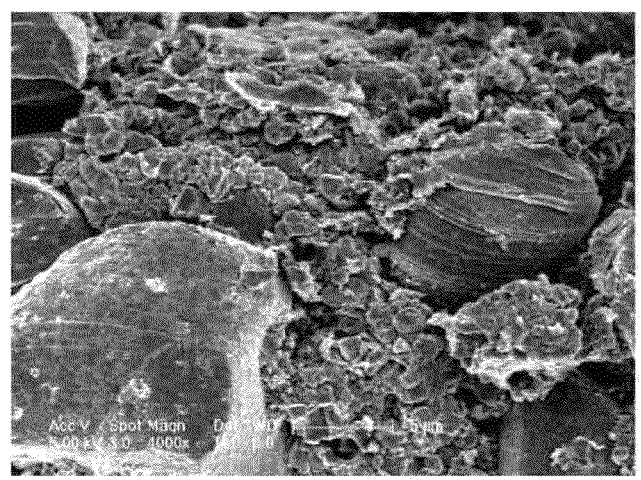
FIG. 9 is a SEM image of a cathode in a state after rolling according to Comparative Example 5.

FIGS. 8 and 9 are each SEM images of the cathode of Example 3 and Comparative Example 5 after applying a pressure thereto.

Referring to FIGS. 8 and 9, the cathode of Example 3 was found to have a decreased degree of crushing the active material after performing the rolling process compared to that of Comparative Example 5.

TABLE 5

| Division | Mixture density of the cathode (g/cc) | Mixture density of the cathode under vacuum drying (VD)* (g/cc) |
|---|---|---|
| Example 4 | 4.20 | 4.02 |
| Comparative Example 5 | 4.15 | 3.92 |

The vacuum drying is performed at a temperature of 100 C for about 4 hours. Under such vacuum conditions, moisture existing in the plate before assembling a cell may be removed.

Referring to Table 5 above, the mixture density of the cathode refers to the plate not being bent when the plate was folded after being rolled.

In this regard, the cathode of Example 4 was found to have a high available mixture density after vacuum drying (VD), compared to that of the Comparative Example 5.

Evaluation Example 8

Capacity, Efficiency, and Lifetime of Full Cel

The full cells of Examples 4 to 6 and Comparative Examples 5 and 6 were charged under conditions of a constant current at a current of 0.2 C until their voltage reached 4.3 V at a temperature of 25° C., and a constant voltage until their currents reached 0.05 C by maintaining the voltage of 4.3V. Then, the full cells were discharged under conditions of a constant current at a current of 0.2 C until their voltage reached 3.0 V during a period of discharge. (Formation step)

Next, the full cells were charged under conditions of a constant current at a current of 0.5 C until their voltage reached 4.3 V, and a constant voltage until their currents reached 0.05 C by maintaining the voltage of 4.3 V. Then, the full cells were discharged under conditions of a constant current at a current of 0.5 C until their voltage reached 3.0 V during a period of discharge (standard step).

The lithium secondary battery, which was prepared after completing the formation step and the standard step, was charged under conditions of a constant current at a current of 0.5 C until its voltage reached 4.3 V each at a temperature of 25° C. and 45° C. Then, the lithium secondary battery was charged under conditions of a constant voltage until its current reached 0.05 C by maintaining the voltage of 4.3 V. Then, a cycle of a constant current discharge at a current of 0.5 C until a voltage reaches 3.0 V was repeated 200 times during a period of discharge.

Results of charging and discharging are shown in Table 6 below, and a capacity maintenance rate is calculated using equation 1 below:

Capacity maintenance rate [%]=[discharge capacity in the 200$^{th}$ cycle/discharge capacity in the 1$^{st}$ cycle]×10    Equation 1

TABLE 6

| Division | Reference | | | Capacity | |
|---|---|---|---|---|---|
| | Charge capacity (mAh) | Discharge capacity (mAh) | Efficiency (%) | maintenance rate in the 200$^{th}$ cycle [%] | |
| | | | | 25° C. | 45° C. |
| Example 4 | 2030 | 2010 | 99 | 98 | 95 |
| Example 5 | 2055 | 2034 | 99 | 95 | 94 |
| Example 6 | 2117 | 2074 | 99 | 94 | 92 |
| Comparative Example 5 | 2008 | 1988 | 99 | 90 | 82 |

TABLE 6-continued

| Division | Reference | | | Capacity | |
|---|---|---|---|---|---|
| | Charge capacity (mAh) | Discharge capacity (mAh) | Efficiency (%) | maintenance rate in the 200$^{th}$ cycle [%] | |
| | | | | 25° C. | 45° C. |
| Comparative Example 6 | 2180 | 2136 | 98 | 87 | 80 |

Referring to Table 6 above, the full cells of Examples 4 to 6 were found to have equally excellent efficiencies after the standard step as those of Comparative Examples 5 and 6. Also, the full cells of Examples 4 to 6 were found to have improved lifetime characteristics compared to those of lithium secondary batteries of Comparative Examples 5 and 6

Evaluation Example 9

Stability of Full Cell

Stability of the full cells of Example 4 and Comparative Example 5 was evaluated in terms of collision, penetration, heat exposure, and overcharge.

Safety evaluation methods are as follows.

Regarding thestability with respect to penetration, a hole was made in the fully charged cell using a 2.5 Φ cylindrical auger at a rate of 60 mm/s to observe the state of the cell. In regard to stability with respect to collision, a 20 Φ circular bar was pressed in the center of the fully charged cell at a rate of 60 mm/s to observe the state of the cell. Regarding stability with respect to heat exposure, the fully charged was left at a temperature of 130° C. for 1 hour to observe the state of the cell. In regard to stability with respect to overcharge, the cell was charged at a current rate of 3 C until its voltage reached 5 V to observe the state of the cell.

Results of the measurements are shown in Table 7 below.

TABLE 7

| | Collision | Penetration (55° C.) | Heat exposure (130° C.) | Overcharge (3 C/5 V) |
|---|---|---|---|---|
| Example 4 | ◉ | ○ | ◉ | ◉ |
| Comparative Example 5 | ○ | Δ | Δ | ◉ |

<Reference>
◉: 81-100% of the total test batteries are in good condition.
○: 61-80% of the total test batteries are in good condition.
Δ: 21-60% of the total test batteries are in good condition.
X: 20% or less of the total test batteries are in good condition.

Referring to Table 7, stability was improved in the full cell prepared according to Example 3 compared to that of Example 5.

As described above, in some embodiments a cathode active material having stability at high voltages may be provided. The cathode active material may be included in a cathode, and thus a cathode plate for a lithium secondary battery may be provided, wherein the cathode plate have a cathode slurry having improved stability and mixture density in a cathode manufacturing process. Also, when the cathode active material is used, gas generation at high voltages may be reduced, and accordingly a lithium secondary battery having improved reliability and safety may be manufactured.

It should be understood that the exemplary embodiments described herein should be considered in a descriptive sense only and not for purposes of limitation. Descriptions of features or aspects within each embodiment should typically be considered as available for other similar features or aspects in other embodiments.

While one or more embodiments of the present invention have been described with reference to the figures, it will be understood by those of ordinary skill in the art that various changes in form and details may be made therein without departing from the spirit and scope of the present invention as defined by the following claims.

What is claimed is:

1. A cathode active material, comprising:
    at least one secondary particle having at least two agglomerates of primary particles,
    wherein the at least one secondary particle comprises a nickel-based lithium transition metal oxide material,
    wherein an average particle diameter of each primary particle is in the range of about 3 μm to about 5 μm,
    wherein the at least one secondary particle comprises at least one selected from the group consisting of a small particle having an average particle diameter in the range from about 5 μm to about 8 μm and a large particle having an average particle diameter in the range from about 10 μm to about 20 μm, and
    wherein a full width at half maximum of a (003) peak is in the range from about 0.120 to about 0.125° in an X-ray diffraction (XRD) spectrum analysis.

2. The cathode active material of claim 1, wherein a full width at half maximum of a (104) peak is in a range from about 0.105 to about 0.110°, and a full width at half maximum of a (110) peak is in a range from about 0.110 to about 0.120° in the XRD spectrum analysis.

3. The cathode active material of claim 1, wherein occupancy of nickel ions in a lithium site is 0.4 atom % or less in the nickel-based transition metal oxide.

4. The cathode active material of claim 1, wherein the cathode active material has a hexagonal crystal structure, and the length of an a-axis is in the range of about 2.867 to about 2.868 Å and the length of a c-axis is in a range from about 14.228 Å to about 14.229 Å, and
    wherein a unit cell volume is in the range of about 101.35 Å³ to about 101.40 Å³.

5. The cathode active material of claim 1, wherein an amount of LiOH is in the range of about 0.01 wt % to about 0.06 wt % and an amount of Li$_2$CO$_3$ is in the range from about 0.05 wt % to about 0.1 wt %.

6. The cathode active material of claim 1, wherein an amount of lithium carbonate measured by gas chromatography-mass spectrometer (GC-MS) analysis is in the range from about 0.01 wt % to about 0.05 wt %.

7. The cathode active material of claim 1, wherein the nickel-based lithium transition metal oxide is a compound represented by Formula 1 below:

$$Li_xCo_aNi_bM_cO_{2+\alpha}$$  Formula 1 wherein 0.9<x<1.5, 0<a<0.5, 0<b<1, 0<c<1, and −0.1≤α≤0.1, and
    wherein M is at least one selected from the group consisting of Mg, Ca, Sr, Ba, Ti, Zr, Nb, Mo, W, Zn, Al, Si, Mn, Cr, Fe, Mg, Sr, V, and a rare earth element.

8. The cathode active material of claim 1, wherein the nickel-based lithium transition metal oxide is a compound represented by Formula 2 below:

$$Li_xCo_aNi_bMn_cO_{2+\alpha}$$  Formula 2 wherein, 0.9<x<1.1, 0<a<0.5, 0.4<b<1, 0<c<0.5, and −0.1≤α≤0.1.

9. The cathode active material of claim 1, wherein the nickel-based lithium transition metal oxide is a compound represented by Li$_{1.05}$Ni$_{0.5}$Co$_{0.2}$Mn$_{0.3}$O$_2$.

10. The cathode active material of claim 1, further comprising a lithium cobalt oxide.

11. The cathode active material of claim 10, wherein the amount of the lithium cobalt oxide is in the range of about 70 parts by weight to about 90 parts by weight based on 100 parts by weight of a total weight of the cathode active material.

12. The cathode active material of claim 1, wherein an onset point temperature of the cathode active material is in the range from about 250° C. to about 270° C. in differential scanning calorimetry.

13. A cathode comprising the cathode active material of claim 1.

14. A lithium secondary battery comprising the cathode of claim 13.

15. A method of preparing a cathode active material, the method comprising:
    obtaining a nickel-based transition metal hydroxide by performing a first heat treatment on a nickel-based transition metal hydroxide precursor at a temperature in the range from about 400° C. to about 600° C.; and
    mixing the nickel-based transition metal hydroxide and a lithium precursor to have a 1.05 or greater weight ratio of lithium with respect to the transition metal and performing a second heat treatment thereon at a temperature of 1,000° C. to about 1,050° C.,
    wherein at least one secondary particle having at least two agglomerates of primary particles is included, the secondary particle comprises a nickel-based lithium transition metal oxide, an average particle diameter of each primary particle is in the range from about 2 μm to about 3 μm, an average particle diameter of the at least one secondary particle is in a range from about 5 μm to about 8 μm, and a full width at half maximum is in a range from about 0.01° to about 0.15° in the XRD spectrum analysis.

16. The method of claim 15, wherein the first heat treatment is performed in an air atmosphere for about 1 hour to about 5 hours.

17. The method of claim 15, wherein the second heat treatment is performed in an air atmosphere for about 5 hour to about 10 hours.

18. The method of claim 15, wherein the nickel-based transition metal hydroxide comprises a nickel precursor, a cobalt precursor, a manganese precursor and any combinations thereof.

19. The method of claim 15, wherein the lithium precursor is at least one selected from the group consisting of lithium hydroxide, lithium carbonate, lithium sulfate, lithium nitrate and any combinations thereof.

20. The method of claim 15, wherein the nickel-based lithium transition metal oxide is a compound represented by Formula 1 below:

$$Li_xCo_aNi_bM_cO_{2+\alpha}$$  Formula 1 wherein 0.9<x<1.5, 0<a<0.5, 0<b<1, 0<c<1, and −0.1≤α≤0.1, and
    wherein M is at least one selected from the group consisting of Mg, Ca, Sr, Ba, Ti, Zr, Nb, Mo, W, Zn, Al, Si, Mn, Cr, Fe, Mg, Sr, V, and a rare earth element.

* * * * *